(12) United States Patent
Stepp et al.

(10) Patent No.: US 11,928,971 B2
(45) Date of Patent: Mar. 12, 2024

(54) DETECTION OF ANOMALOUS STATES IN MULTIVARIATE DATA

(71) Applicant: THE BOEING COMPANY, Chicago, IL (US)

(72) Inventors: Nigel Stepp, Santa Monica, CA (US); Tsai-Ching Lu, Thousand Oaks, CA (US); Franz David Betz, Renton, WA (US)

(73) Assignee: BOEING COMPANY, Arlington, VA (US)

( * ) Notice: Subject to any disclaimer, the term of this patent is extended or adjusted under 35 U.S.C. 154(b) by 322 days.

(21) Appl. No.: 17/644,700

(22) Filed: Dec. 16, 2021

(65) Prior Publication Data

US 2022/0327943 A1 Oct. 13, 2022

Related U.S. Application Data

(60) Provisional application No. 63/169,402, filed on Apr. 1, 2021.

(51) Int. Cl.
*G08G 5/00* (2006.01)
*G07C 5/00* (2006.01)
*G07C 5/08* (2006.01)

(52) U.S. Cl.
CPC .......... *G08G 5/0043* (2013.01); *G07C 5/008* (2013.01); *G07C 5/0816* (2013.01); *G07C 5/085* (2013.01)

(58) Field of Classification Search
CPC ........ G08G 5/0043; G07C 5/00; G07C 5/008; G07C 5/0816; G07C 5/0825; G06F 13/42; G06F 11/34; G06F 11/3809; G06F 30/20; G06F 16/2365; G06F 16/2477; G06F 17/00; G06F 17/13; G06N 5/04
USPC .............................................. 701/3
See application file for complete search history.

(56) References Cited

U.S. PATENT DOCUMENTS

| | | | |
|---|---|---|---|
| 9,020,689 B2 | 4/2015 | Smith et al. | |
| 9,215,244 B2 | 12/2015 | Ayyagari et al. | |
| 10,132,709 B2 | 11/2018 | Cousins et al. | |
| 10,565,185 B2 * | 2/2020 | Gross | G06F 16/2365 |
| 10,587,635 B2 | 3/2020 | Keller et al. | |
| 10,657,736 B2 | 5/2020 | Sundareswara et al. | |
| 10,678,740 B1 * | 6/2020 | Askeland | G07C 5/08 |
| 10,699,040 B2 | 6/2020 | Martin et al. | |
| 10,719,772 B2 | 7/2020 | Boggio | |

(Continued)

*Primary Examiner* — Andrew Joseph Rudy
(74) *Attorney, Agent, or Firm* — Moore IP Law

(57) ABSTRACT

A method includes obtaining a plurality of data sets, where each data set of the plurality of data sets includes multivariate time series data for a respective sample period of a plurality of sample periods. The method also includes, for each data set of the plurality of data sets, determining recurrence data indicative of recurrent states in the data set and determining, based on the recurrence data, determinism values of a determinism metric and laminarity values of a laminarity metric. The method further includes determining that a particular data set of the plurality of data sets includes data representing an anomalous state based on a determinism-laminarity curve representing the particular data set, where the determinism-laminarity curve is based on the determinism values of the particular data set and the laminarity values of the particular data set. The method also includes generating output data indicating the anomalous state.

20 Claims, 11 Drawing Sheets

(56) References Cited

U.S. PATENT DOCUMENTS

| | | | |
|---|---|---|---|
| 11,385,631 B2* | 7/2022 | Rodemann | G06Q 50/30 |
| 2005/0131592 A1 | 6/2005 | Chiang | |
| 2015/0186335 A1* | 7/2015 | Senalp | G06F 30/20 |
| | | | 703/2 |
| 2019/0304206 A1 | 10/2019 | Schmitz et al. | |
| 2020/0302094 A1* | 9/2020 | Greenwood | G06N 3/126 |

* cited by examiner

DETECTION OF ANOMALOUS STATES IN MULTIVARIATE DATA

CROSS-REFERENCE TO RELATED APPLICATIONS

The present application claims priority from U.S. Provisional Patent Application No. 63/169,402 entitled "DETECTION OF ANOMALOUS STATES IN MULTIVARIATE DATA," filed Apr. 1, 2021, the contents of which are incorporated by reference in their entirety.

FIELD OF THE DISCLOSURE

The present disclosure is generally related to detect anomalous states in multivariate data.

BACKGROUND

Many complex systems include sensors to record data representing various states of the system. For example, the sensors may generate data that is used to detect fault conditions. While detecting that a fault condition is present facilitates diagnosing and responding to the fault condition, better outcomes (e.g., in terms of convenience, uptime availability, and conservation of resources) may be achieved by detecting conditions that precede a fault condition so that preventative, rather than responsive, actions can be taken. However, in many instances, the sensors of such complex system generate so much data that it can be difficult to determine which states indicated by the sensor data precede a fault condition.

SUMMARY

In a particular implementation, a system includes a memory configured to store processor-executable instructions and a plurality of data sets, where each data set of the plurality of data sets includes multivariate time series data for a respective sample period of a plurality of sample periods. The system also includes one or more processors configured to execute the processor-executable instructions to cause the one or more processors to, for each data set of the plurality of data sets, determine recurrence data indicative of recurrent states in the data set. The processor-executable instructions also cause the one or more processors to, for each data set of the plurality of data sets, determine, based on the recurrence data, determinism values of a determinism metric and laminarity values of a laminarity metric. The processor-executable instructions also cause the one or more processors to determine that a particular data set of the plurality of data sets includes data representing an anomalous state based on a determinism-laminarity curve representing the particular data set, where the determinism-laminarity curve is based on the determinism values of the particular data set and the laminarity values of the particular data set. The processor-executable instructions also cause the one or more processors to generate output data indicating the anomalous state.

In another particular implementation, a method includes obtaining a plurality of data sets, where each data set of the plurality of data sets includes multivariate time series data for a respective sample period of a plurality of sample periods. The method also includes, for each data set of the plurality of data sets, determining recurrence data indicative of recurrent states in the data set and determining, based on the recurrence data, determinism values of a determinism metric and laminarity values of a laminarity metric. The method further includes determining that a particular data set of the plurality of data sets includes data representing an anomalous state based on a determinism-laminarity curve representing the particular data set, where the determinism-laminarity curve is based on the determinism values of the particular data set and the laminarity values of the particular data set. The method also includes generating output data indicating the anomalous state.

In another particular implementation, a computer-readable storage device storing processor-executable instructions that are executable by one or more processors to cause the one or more processors to perform operations including obtaining a plurality of data sets, where each data set of the plurality of data sets includes multivariate time series data for a respective sample period of a plurality of sample periods. The operations also include, for each data set of the plurality of data sets, determining recurrence data indicative of recurrent states in the data set and determining, based on the recurrence data, determinism values of a determinism metric and laminarity values of a laminarity metric. The operations also include determining that a particular data set of the plurality of data sets includes data representing an anomalous state based on a determinism-laminarity curve representing the particular data set, where the determinism-laminarity curve is based on the determinism values of the particular data set and the laminarity values of the particular data set. The operations also include generating output data indicating the anomalous state.

The features, functions, and advantages described herein can be achieved independently in various implementations or may be combined in yet other implementations, further details of which can be found with reference to the following description and drawings.

DETAILED DESCRIPTION

Figure 1:
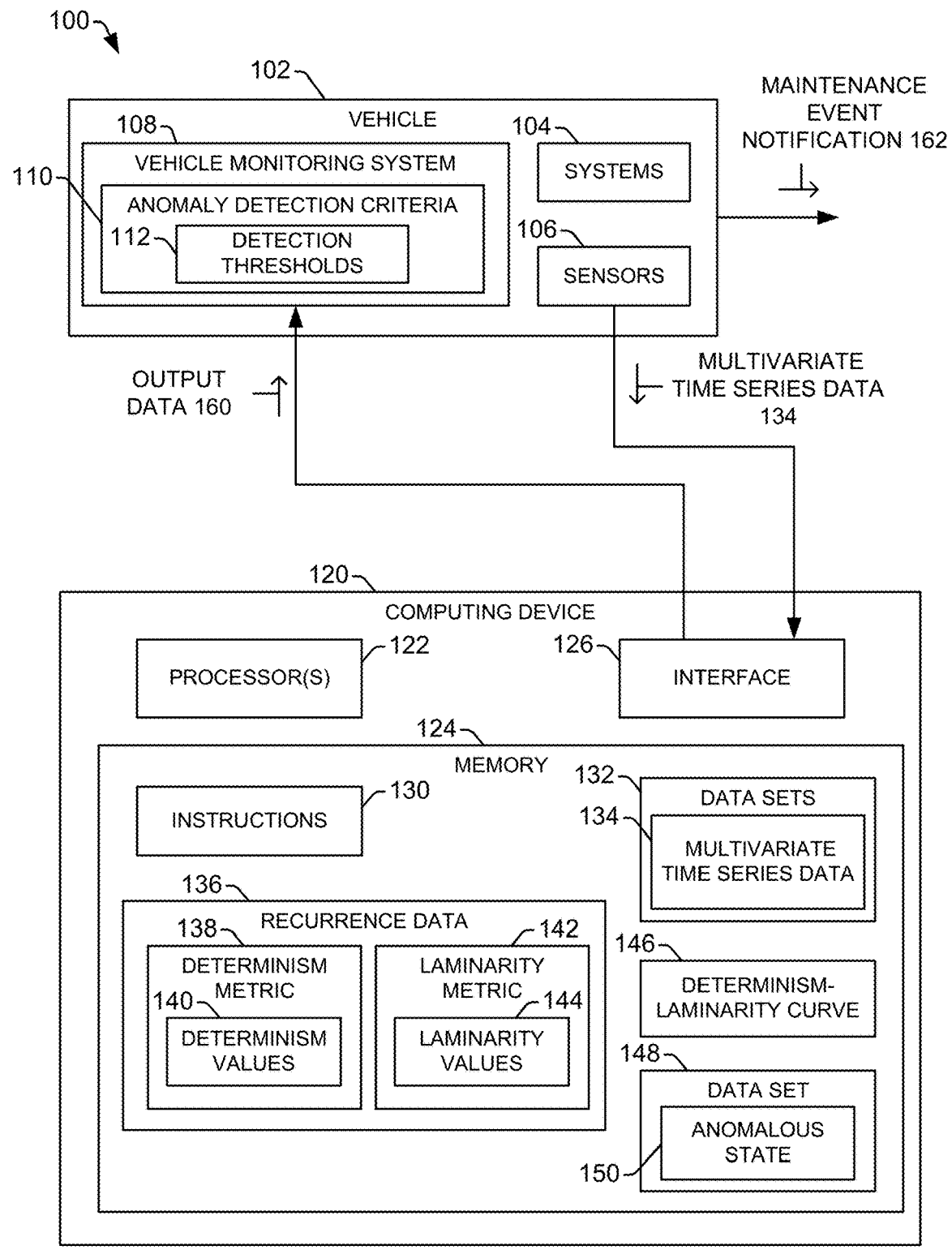
FIG. 1 is a diagram that illustrates a system for detecting anomalous states in multivariate data.

Particular aspects disclosed herein facilitate detection of anomalous conditions in sensor data to facilitate preventative or responsive maintenance action. As one example, the sensor data may be generated by sensors of a vehicle, such as an aircraft, a watercraft, a land craft, or a space craft. In this example, the sensor data may be generated by many different types of sensors associated with various systems, components, and sub-components of the vehicle.

Many modern vehicles include sensors that generate so much sensor data that analyzing all of the sensor data generated during operation of the vehicle is expensive, time-consuming, and resource intensive (e.g., in terms of processor capacity, processor time, memory utilization, etc.). As a result, it is difficult and expensive to determine which sensor data represent typical operating conditions and which sensor data represent anomalous operating conditions.

In many implementations, the sensor data is provided as input to a monitoring system, and the monitoring system detects a state of the vehicle or of a system of the vehicle based on the sensor data. In some systems, the monitoring system compares the sensor data (or portions thereof) to pre-determined set points to determine whether the vehicle is experiencing a fault condition. Often such set points are determined during design or specification of the vehicle. For example, an engine designer may determine that an oil pressure value less than a threshold value indicates failure of an oil supply system of the engine. In this example, the threshold value specified by the engine designer may be stored in the monitoring system and used to generate an oil pressure warning if the oil pressure value falls below the threshold value.

In examples such as the one above, the threshold value may be based on engineering rules of thumb, based on information provided by a supplier, based on an industry standard, etc. As a result, such values are generally only useful to indicate that a fault condition is present, rather than, for example, to indicate that a fault condition is expected in the near-future. Put another way, comparing sensor data to such threshold values is more useful to diagnose a system rather than to predict a future state of the system.

Additionally, such threshold values are usually determined on a sensor-by-sensor basis or a sensor system basis. In this example, a sensor system refers to a set of sensors that are designed in advance to work together to monitor a system or component for a particular fault. To illustrate, a sensor system on an aircraft may sense air temperature (using a temperature sensor) and differential pressure (using one or more pressure sensors) to generate an estimate of air flow rate. In this example, the temperature sensor and pressure sensor(s) are a sensor system to determine air flow rate data. Setting threshold values on a sensor-by-sensor basis or a sensor system basis can overlook inter-relations among the sensor data values from multiple independent sensors. However, inter-relations among the sensor data values from multiple independent sensors can indicate conditions that are precursors of fault conditions or that otherwise merit evaluation and/or maintenance, e.g., preventative maintenance.

Aspects disclosed herein facilitate unsupervised analysis of large quantities of historical sensor data to identify anomalous conditions. Specific sensor data values associated with the anomalous conditions can be identified in order to determine thresholds that indicate anomalous operation of a system even before occurrence of a fault condition. The unsupervised analysis of sensor data enables co-analysis of data generated by sensors of different types (which may have different operating ranges and different sampling rates) to identify sets of conditions that are indicative of anomalous operation. Results of the analysis can be used to set monitoring thresholds to detect when anomalous operations occur so that a maintenance notification can be generated.

In a particular aspect, the unsupervised analysis generates recurrent data that is indicative of recurrent states in the sensor data. The recurrence data is evaluated, using an unthresholded process, to determine values of a determinism metric and a laminarity metric. The determinism metric is analogous to a determinism value from recurrent quantification analysis (RQA), and the laminarity metric is analogous to a laminarity value from RQA. However, in RQA, a recurrence matrix is derived from a distance matrix using a threshold, e.g., a radius. The threshold indicates how close together in the distance matrix two points must be to be considered recurrences. In the disclosed implementations, no such threshold is used. Rather, the determinism metric and the laminarity metric disclosed herein are determined by convolving the distance matrix with a respective filter (similar to an edge or line detection filter). To generate values of the determinism metric, the filter has parameters to detect features that appear as diagonal lines in the distance matrix. To generate values of the laminarity metric, the filter has parameters to detect features that appear as vertical lines in the distance matrix. Similar to determinism values and laminarity values in RQA, the values of the determinism metric and the laminarity metric are generally indicative of dynamic features of the sensor data, such as how deterministic the sensor data is. For example, periodic signals (e.g., sine waves) generate long diagonal lines (resulting in a high determinism value), chaotic signals generate short diagonal lines (resulting in a lower determinism value), and stochastic signals do not generate diagonal lines (resulting in a still lower or near zero determinism value).

In RQA, the threshold selected can dramatically change the recurrence matrix, and the resulting determinism and laminarity values. When a large number of sensors with different sampling rates and ranges are used, it can be difficult and time consuming to select an appropriate threshold. For example, the analysis may need to be repeated multiple times using different thresholds to ensure that an appropriate threshold is selected. The threshold-less process disclosed herein eliminates the time required to select and test various thresholds and conserves computing resources that would be used to repeat the analysis multiple times using different thresholds.

According to a particular aspect, the values of the determinism metric and the values of the laminarity metric for a particular data set define a determinism-laminarity curve for the particular data set. Behavioral differences can be detected by comparing the determinism-laminarity curves for multiple data sets. When the determinism-laminarity curve of a particular data set deviates from a determinism-laminarity curve that represents multiple data sets or that represents a "known good" data set, this is an indication that the particular data set represent an anomalous condition. Aspects disclosed herein are able to detect such deviations in a determinism-laminarity curve and trace the deviations back to the sensor data that caused the deviations in order to identify the anomalous condition in the sensor data. In a particular aspect, the sensor data associated with an anomalous condition is used to determine one or more detection thresholds for one or more sensor data values. To illustrate, in a particular example, the one or more detection thresholds are provided to a monitoring system. In this particular example, during operation of a monitored system, such as a vehicle, real-time sensor data values are provided to the monitoring system, and the monitoring system generates a notification when the real-time sensor data satisfies the one or more detection thresholds.

Thus, the disclosed aspects provide an efficient mechanism to detect anomalous conditions that may precede fault conditions. The disclosed aspects avoid the use of a preset threshold to guide the analysis (e.g., to determine determinism and laminarity values), which conserves resources (e.g., processor time and memory) and enables co-analysis of sensor data from a wide variety of different sensor types.

The figures and the following description illustrate specific examples. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific examples described below, but by the claims and their equivalents.

Particular implementations are described herein with reference to the drawings. In the description, common features are designated by common reference numbers throughout the drawings.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a computing device 120 including one or more processors ("processor(s) 122 in FIG. 1), which indicates that in some implementations the computing device 120 includes a single processor 122 and in other implementations the computing device 120 includes multiple processors 122. For ease of reference herein, such features are generally introduced as "one or more" features and may subsequently be referred to in the singular or optional plural (generally indicated by "(s)" at the end of the feature name), unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates a system 100 for detecting anomalous states in multivariate data. The system 100 includes a vehicle 102 and a computing device 120. Although the vehicle 102 and the computing device 120 are illustrated as separate components of the system 100 in the implementation illustrated in FIG. 1, in other implementations, the vehicle 102 and the computing device 120 are combined. For example, the computing device 120 is disposed on-board the vehicle 102.

The vehicle 102 corresponds to or includes a land craft, a watercraft, an aircraft, or a space craft. To illustrate, in a particular implementation, the vehicle 102 is a truck, a train, a bus, a car, a motorcycle, a tractor, or another manned or unmanned land craft. In another particular implementation, the vehicle 102 is a boat, a ship, a personal watercraft, a barge, a submarine, a hydrofoil, or another manned or unmanned watercraft. In another particular implementation, the vehicle 102 is a fixed wing aircraft (e.g., an airplane), a rotary wing aircraft (e.g., a helicopter), a lighter than air aircraft (e.g., a blimp or balloon), a hybrid of two or more of the preceding types of aircraft (e.g., a tilt wing or tilt rotor aircraft), or another manned or unmanned aircraft. In still another particular implementation, the vehicle 102 is a satellite, a launch vehicle, an orbital station, or another manned or unmanned spacecraft.

The vehicle 102 includes a plurality of systems 104, one or more of which are associated with sensors 106. The sensors 106 are configured to generate sensor data representative of a sensed state of at least a portion of one or more of the systems 104. The sensors 106 generally include multiple different types of sensors to detect different aspects or conditions associated with the systems 104. To illustrate, the sensors 106 may include temperature sensors, pressure sensors, electromagnetic sensors, orientation sensors, flow sensors, movement sensors, chemical sensors, speed sensors, position sensors, other types of sensors, or any combination thereof. As used herein, a sensor refers to any configuration of devices or hardware that is operable to generate an analog or digital signal, or to modify or encode information on an analog or digital signal to represent a detected state or detected state change. As an example, a sensor may include a special purpose circuit that generates a digital or analog signal representing a detected sensor data value, such as a temperature of a component.

In the example illustrated in FIG. 1, the vehicle 102 includes a vehicle monitoring system 108. In this example, one or more of the sensors 106 are coupled to the vehicle monitoring system 108 to provide sensor data to the vehicle monitoring system 108 during operation of the vehicle 102. The vehicle monitoring system 108 is configured to compare one or more sensor data values from the sensor data to anomaly detection criteria 110 to detect anomalous operation of one or more of the systems 104. For example, the anomaly detection criteria 110 indicate one or more detection thresholds 112, which if satisfied indicate that an anomalous condition is detected.

The computing device 120 of FIG. 1 includes one or more processors 122, a memory 124, and an interface 126. The processor(s) 122 include digital (and possibly some analog) circuits including logic gates, local memory (e.g., registers and caches), and other special-purpose or general-purpose circuit elements arranged to execute instructions 130 from the memory 124. The interface 126 includes digital and/or analog circuits configured to send and receive data via a wired or wireless data connection. To illustrate, when the interface 126 is configured to support a wireless data connection, the interface 126 may include one or more antennas, one or more amplifiers, one or more codecs, and possibly other components to facilitate receipt of signals (e.g., radiofrequency signals, optical signals, audio signals, or signals encoded in other waveforms), to facilitate transmission of signals, to facilitate conversion of signals into data that can be processed by the processor(s) 122 or stored in the memory 124, or a combination thereof. The memory 124 includes circuits or other structures configured to change physical, electrical, optical, or magnetic states to encode data and to read or write the data to enable the processor(s) 122 to access the data. For example, the memory 124 may include or correspond to random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium.

The computing device 120 is configured to obtain multivariate time series data 134 from the sensors 106 of the vehicle 102, from the memory 124, or both, and to generate output data 160 indicating anomalous states detected within the multivariate time series data 134. For example, the memory 124 stores instructions 130 that are executable by the processor(s) 122 to cause the processor(s) to generate the output data 160. As an example, the instructions 130 are executable by the processor(s) 122 to cause the processor(s) 122 to access a plurality of data sets 132 where each data set of the plurality of data sets 132 includes a portion of the multivariate time series data 134 for a respective sample period of a plurality of sample periods. The instructions 130 are further executable by the processor(s) 122 to cause the processor(s) 122 to, for each data set of the plurality of data sets 132, determine recurrence data 136 indicative of recurrent states in the data set and determine, based on the recurrence data 136, determinism values 140 of a determinism metric 138 and laminarity values 144 of a laminarity metric 142. The instructions 130 are further executable by the processor(s) 122 to cause the processor(s) 122 to determine that a particular data set (such as a representative data set 148) of the plurality of data sets 132 includes data representing an anomalous state 150 based on a determinism-laminarity curve 146 representing the particular data set. The determinism-laminarity curve 146 is based on the determinism values 140 of the particular data set and the laminarity values 144 of the particular data set. The instructions 130 are further executable by the processor(s) 122 to cause the processor(s) 122 to generate the output data 160 indicating the anomalous state 150. In this example, the output data 160 are used to set one or more of the anomaly detection criteria 110 of the vehicle monitoring system 108 based on data values of the particular data set that corresponds to the anomalous state 150.

In a particular aspect, the output data 160 are used to set one or more of the anomaly detection criteria 110 of the vehicle monitoring system 108 based on data values of the particular data set that corresponds to the anomalous state 150. After the anomaly detection criteria 110 are set, the vehicle monitoring system 108 uses the anomaly detection criteria 110 to monitor real-time sensor data from the sensors 106. For example, the vehicle monitoring system 108 is configured to generate a maintenance event notification 162 based on one or more of the anomaly detection criteria 110 being satisfied.

Figure 2A:
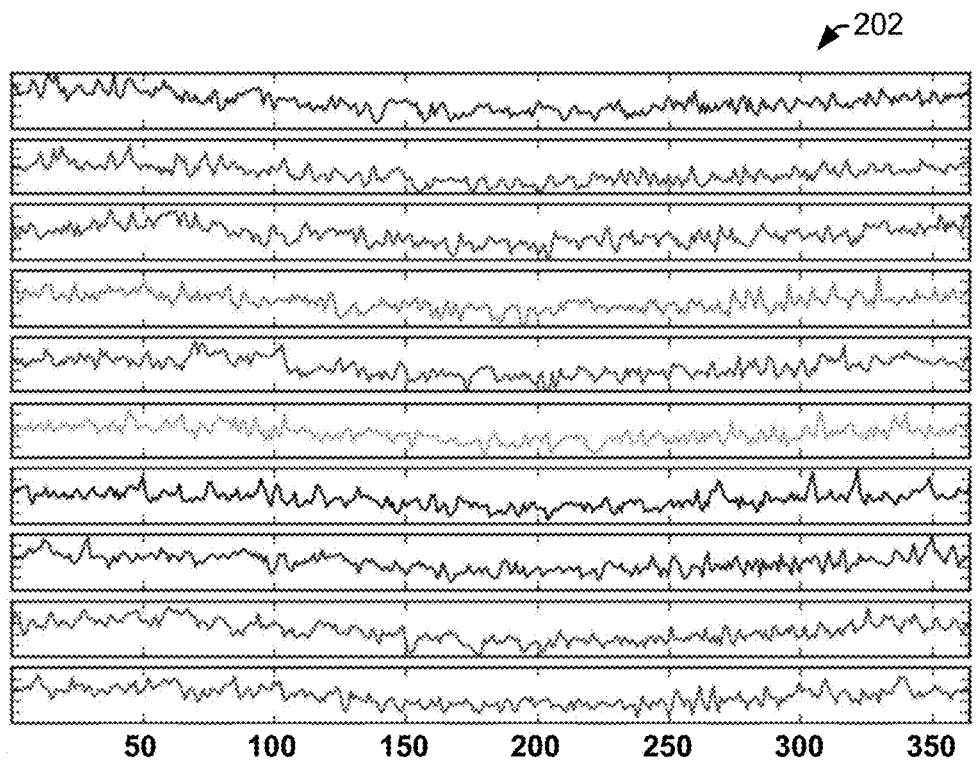
FIGS. 2A, 2B, 2C, 2D, and 2E are diagrams illustrating various aspects of detecting anomalous states in multivariate data.
Figure 2B:
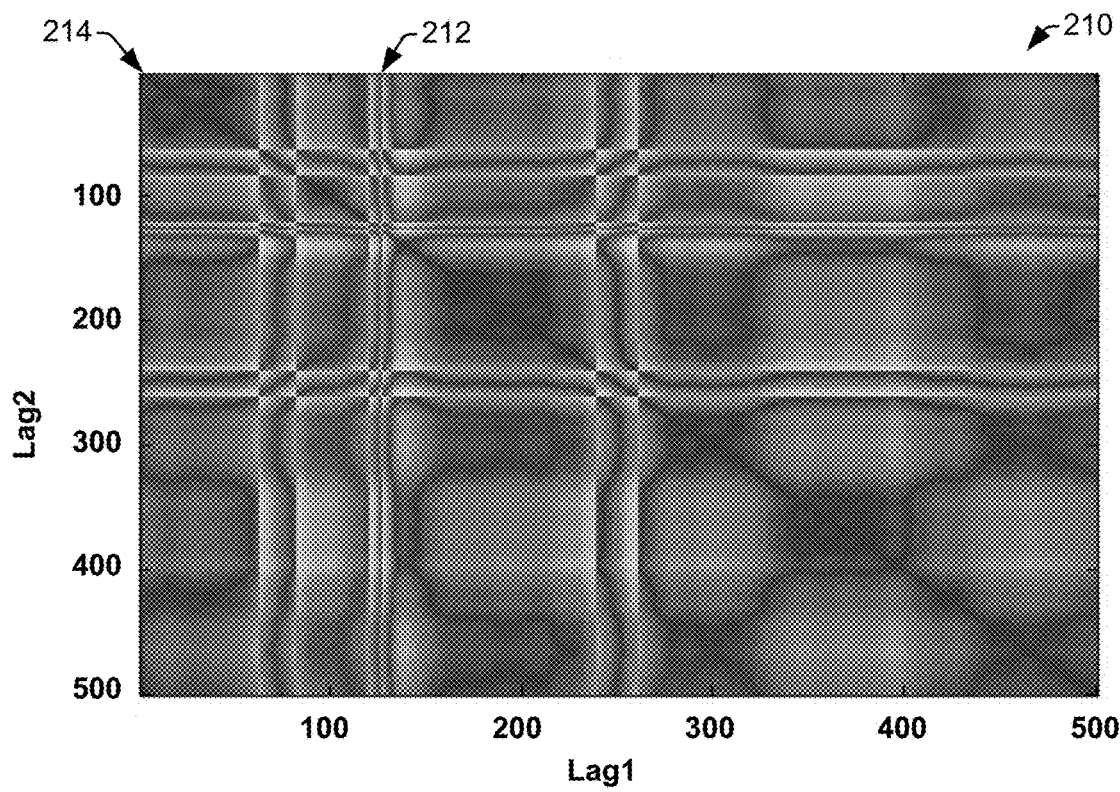

FIGS. 2A-2E are diagrams illustrating various aspects of the operations performed by the processor(s) 122 during execution of the instructions 130. For example, FIG. 2A illustrates a data set including multivariate time series data 134. FIG. 2B illustrates a distance matrix 210 illustrating recurrences in the multivariate time series data 134. The distance matrix 210 indicated distances in a multidimensional space between two points of the multivariate time series data 134, where the multidimensional space has a number of dimensions corresponding to the number of variables of the multivariate time series data 134. For example, if twenty different sensors generate twenty distinct sensor data values, the multivariate time series data 134 represents twenty variables, and the multidimensional space has twenty dimensions.

In a particular implementation, the instructions 130 include instructions to generate a distance matrix for each data set of the plurality of data sets 132. An example of a distance matrix 210 is illustrated in FIG. 2B. The distance matrix 210 of FIG. 2B is based on the data set 202 of FIG. 2A. The data set 202 of FIG. 2A is one, non-limiting example of one of the data sets 132 of FIG. 1. In FIG. 2A, each row represents time series data for a particular variable and sample period, and the set of rows together represent multivariate time series data for one or more sample periods. The distance matrix 210 is a graphical representation of recurrence data indicative of recurrent states in the data set 202.

In a particular implementation, the distance matrix 210 is determined using recurrence quantification analysis operations. For example, the distance matrix 210 is determined using Equation 1 below:

$$D_{ij}(m) = \|x(j) - x(i)\|, i, j \in \{m \ldots m+w\} \quad \text{Equation 1}$$

where $D_{ij}(m)$ represents a distance metric value of the distance matrix 210 for a sample period i and a sample period j during a time window that starts at a sample period m and ends at a sample period m+w, w is a window size, x(i) represents a first point in a multidimensional space representing sensor values of the sample period i (e.g., a column of the data set 202 representing sensor values of the sample period i), x(j) represents a second point in the multidimensional space representing sensor values of the sample period j (e.g., a column of the data set 202 representing sensor values of the sample period j), and $\|x(j) - x(i)\|$ represents a distance in the multidimensional space between the first point and the second point.

The distance matrix 210 is used to determine, for the data set 202, the determinism values 140 of the determinism metric 138 and the laminarity values 144 of the laminarity metric 142. For example, the distance matrix 210 is convolved with a first Gabor filter to generate the determinism values 140 for the data set 202 and is convolved with a second Gabor filter to generate the laminarity values 144 for the data set 202. A Gabor filter, G, is described by Equation 2:

$$G(t, f, \psi; \alpha, \delta) = \exp\left[-\frac{t'\left(\frac{t}{\Delta t}, \frac{f}{\Delta f}\right)^2 + f'\left(\frac{t}{\Delta t}, \frac{f}{\Delta f}\right)^2}{2\delta^2}\right]\exp\left[i2\pi\alpha\left(\frac{ut}{\Delta t} + \frac{vf}{\Delta f}\right)\right] \qquad \text{Equation 2}$$

where $\alpha$; $\delta$, t, f, $\Delta t$, $\Delta f$ are tunable parameters, u=cos $\psi$, v=sin $\psi$, t'(a, b)=au+bv, f'(a, b)=−av+bu, and $\psi$ represents an angle of the filter. The Gabor filter specified by Equation 2 identifies or selects stripes oriented in a particular direction. The $\alpha$ and $\delta$ parameters control the width and spacing, respectively, of the stripes, the parameter controls the angle of the stripes, the t and f parameters are coordinates of a 2D filter, and the $\Delta t$, $\Delta f$ parameters control the resolutions in each axis. For the analysis illustrated in FIGS. 2A-2F, the values of the tunable parameters were set to $\alpha$=16, $\delta$=4, t={−8 . . . 8}, f={−8 . . . 8}, $\Delta t$=1, and $\Delta f$=1. Additionally, the first Gabor filter is angularly offset from the second Gabor filter by $\pi/4$. For example, for the analysis illustrated in FIGS. 2A-2F, a value of the angle $\psi$ of the first Gabor filter is set to $$\frac{3\pi}{4},$$

and the value of the angle $\psi$ of the second Gabor filter is set to $$\frac{\pi}{2}.$$

Convolving the first Gabor filter with the distance matrix 210 thus indicates diagonal lines (such as a diagonal line 214) in the distance matrix 210 and convolving the second Gabor filter with the distance matrix 210 indicates vertical lines (such as a vertical line 212) in the distance matrix 210.

The determinism values 140 (e.g., represented by the diagonal lines) detected by convolving the distance matrix 210 and the first Gabor filter, and the laminarity values 144 (e.g., represented by the vertical lines) detected by convolving the distance matrix 210 and the second Gabor filter define a determinism-laminarity curve 146 for the data set 202.

Figure 2C:
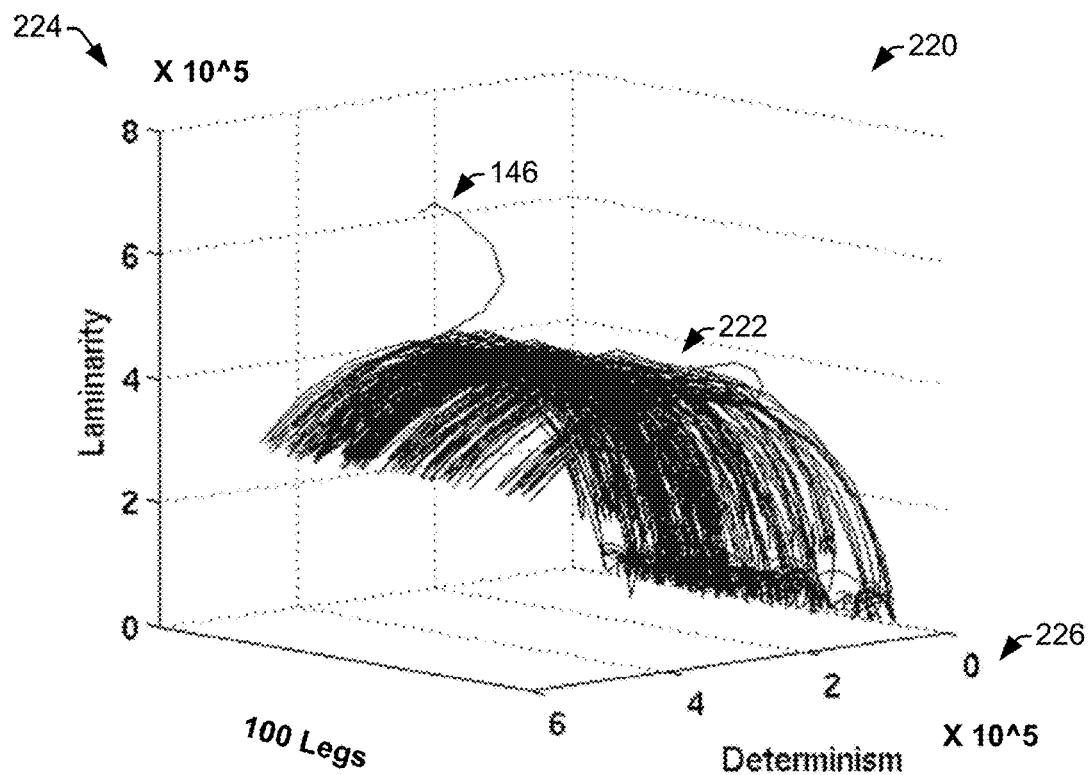

The process above is repeated for other data sets of the plurality of data sets 132 to generate a plurality of determinism-laminarity curves, including one determinism-laminarity curve for each respective data set of the plurality of data sets 132. For example, FIG. 2C illustrates a diagram 220 that includes a plurality of determinism-laminarity curves 222. In the diagram 220, data for one hundred (100) sample periods, representing one hundred flight legs, is represented by one hundred determinism-laminarity curves 222. Additionally, laminarity values are indicated along a first axis 224 and determinism values are represented along a second axis 226.

Visual inspection of the diagram 220 shows that one of the determinism-laminarity curves, e.g., the determinism-laminarity curve 146, deviates significantly from the other determinism-laminarity curves. The deviation of the determinism-laminarity curve 146 from the other determinism-laminarity curves indicates that the determinism-laminarity curve 146 represents an anomalous condition. For example, the determinism-laminarity curve 146 represents the data set 148 of FIG. 1, which includes data representing the anomalous state 150.

In a particular implementation, a representative determinism-laminarity curve is determined to represent the determinism-laminarity curves 222. In a particular aspect, the representative determinism-laminarity curve for a time window starting at a time m, $\overline{p}(m)$, is determined using Equation 3:

$$\overline{p}(m) = \frac{\sum_i^N p_i(m)}{N} \qquad \text{Equation 3}$$

where N is the number of determinism-laminarity curves of the determinism-laminarity curves 222, and $p_i(m)$ represents an ith determinism-laminarity curve. Determining the representative determinism-laminarity curve simplifies quantitative detection of determinism-laminarity curve(s) that represent anomalous conditions. For example, each determinism-laminarity curve can be compared to the representative determinism-laminarity curve to detect significant deviations.

Figure 2D:
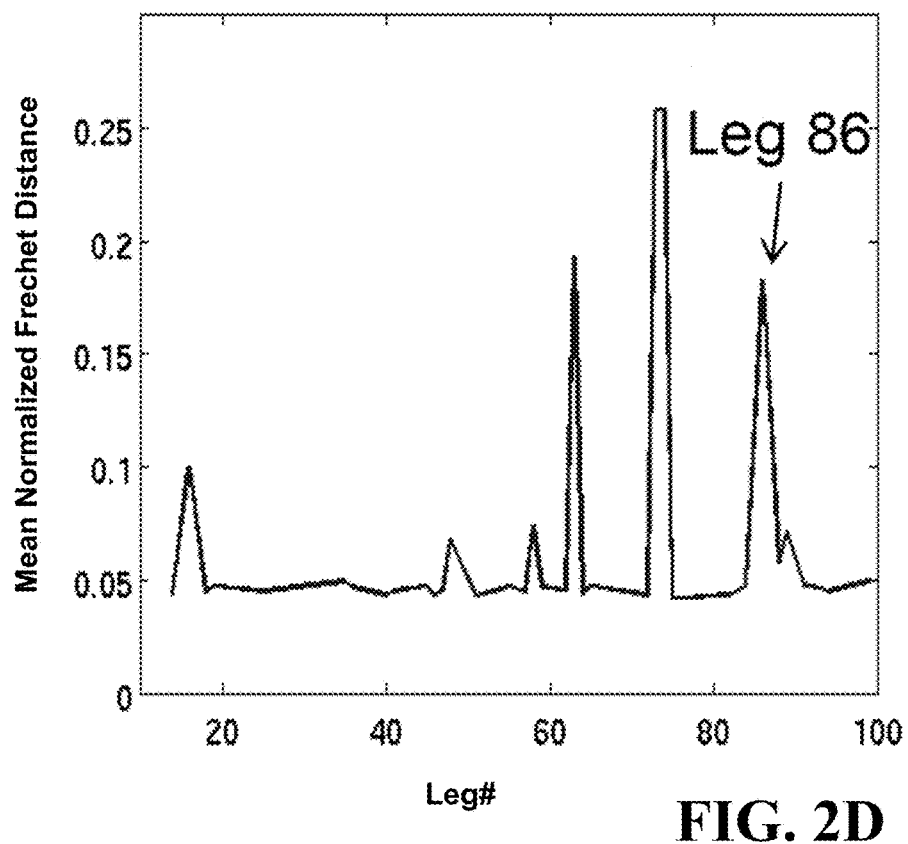

In a particular implementation, a curve distance metric, such as a Fréchet distance, $d_F$, is used to identify significant deviations between a determinism-laminarity curve and the representative determinism-laminarity curve. In this implementation, the Fréchet distance, $d_F$, between the representative determinism-laminarity curve and each of the determinism-laminarity curves 222 is determined. Any determinism-laminarity curve associated with a Fréchet distance, $d_F$, greater than a threshold distance, $\theta_F$, is determined to deviate significantly from the representative determinism-laminarity curve, and therefore to represent an anomalous condition. FIG. 2D illustrates a graph 230 showing mean normalized Fréchet distance values for the one hundred flight legs represented by the determinism-laminarity curves 222 of FIG. 2C. In the specific example illustrated by FIGS. 2C and 2D, the determinism-laminarity curve 146 of FIG. 2C corresponds to the peak associated with leg 86 (e.g., corresponding to sample period 86) in FIG. 2D.

According to a particular aspect, anomalous conditions detected in the determinism-laminarity curves 222 can be traced back to original high-dimensional state in the data set 202. For example, the portion of the determinism-laminarity curve 146 that includes the deviation can be identified, then the time period and data values of the data set 202 associated with the portion of the determinism-laminarity curve 146 that includes the deviation can be identified.

Figure 2E:
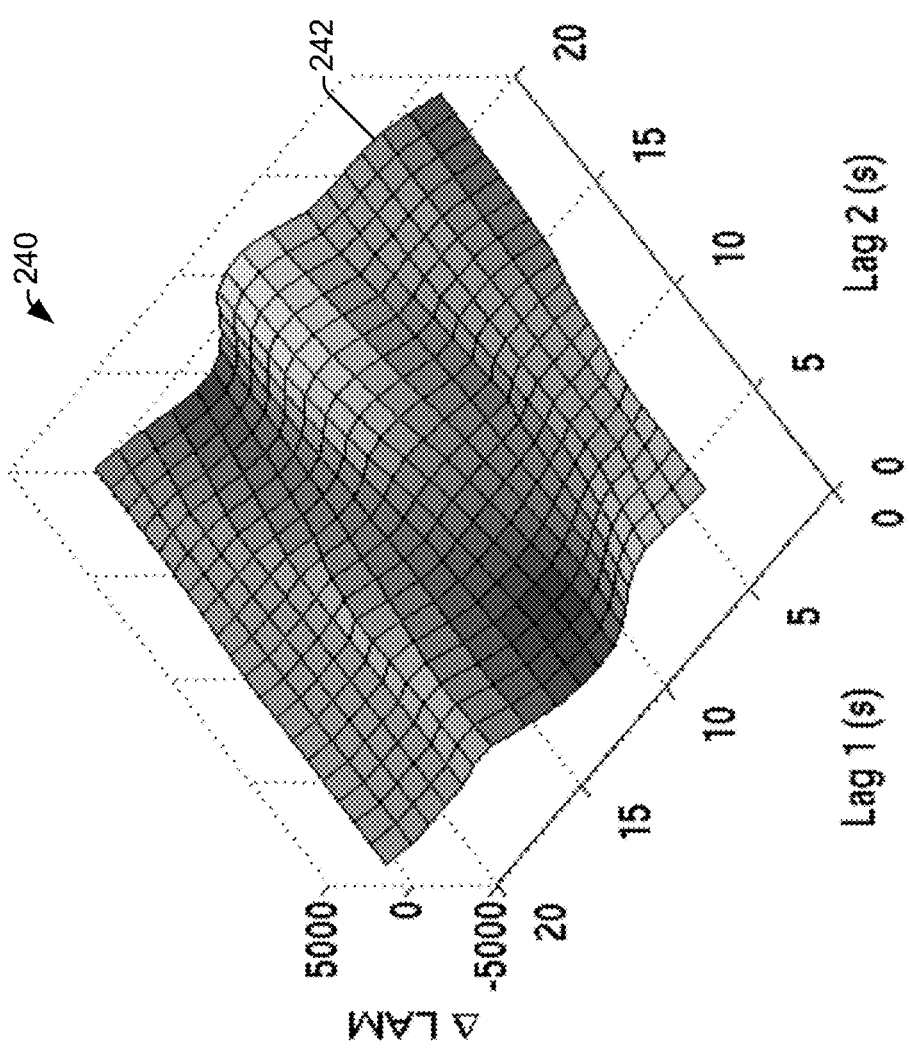

The portion of the determinism-laminarity curve 146 that includes the deviation can be identified by calculating a determinism difference ($\Delta$DET) between the determinism values of the determinism-laminarity curve 146 and the determinism values of the representative determinism-laminarity curve and determining a laminarity difference ($\Delta$LAM) between the laminarity values of the determinism-laminarity curve 146 and the laminarity values of the representative determinism-laminarity curve. The determinism difference values are compared to a determinism threshold, $\theta_D$, that is based on a standard deviation (or other variation metric) associated with the determinism values used to determine the representative determinism-laminarity curve. Likewise, the laminarity difference values are compared to a laminarity threshold, $\theta_D$, that is based on a standard deviation (or other variation metric) associated with the determinism values used to determine the representative determinism-laminarity curve. FIG. 2E illustrates a diagram 240 showing a surface 242 representing a laminarity difference (ΔLAM) corresponding to various portions of the distance matrix 210. For example, the determinism threshold, $\theta_D$, may be set to 1.5 times the standard deviation of the determinism values, and the laminarity threshold, $\theta_L$, may be set to 1.5 times the standard deviation of the laminarity values.

The portion(s) of the determinism-laminarity curve 146 that include the deviation correspond to portion(s) associated with determinism difference values that exceed the determinism threshold and laminarity difference values that exceed the laminarity threshold. In some implementations, a critical state can be identified within the portion(s) of the determinism-laminarity curve 146 that includes the deviation. In this context, a "critical state" refers to a set of data values of the data set that are representative of a cause (or the cause) of the data set being identified as anomalous. The critical state represents a vector of values of variables of the multivariate time series data for a particular sample period or set of sample periods corresponding to the anomalous condition.

As an example, the critical state, x*, may correspond to a set of values, $x_D^*$, representing the maximum determinism difference value and a set of values, $x_L^*$, representing the maximum laminarity difference value. Alternatively, the critical state, x*, may be determined as the set of values representing a weighted average of the maximum determinism difference value and the maximum laminarity difference value.

In some implementations, specific variables with values that are likely responsible for the critical state can be determined. For example, a coefficient of variation (CoV) value, a signal to noise (SNR) value, and a confidence interval zero crossing (ZX) value can be calculated for each variable of the multivariate data using Equations 4-6:

$$CoV = \left|\frac{s}{m}\right|$$ Equation 4

$$SNR = \left|\frac{m'}{s'}\right|$$ Equation 5

$$ZX = |signum(m - se) - signum(m + se)|$$ Equation 6 where m, s, and se are mean, standard deviation, and standard error of the determinism-laminarity curves (e.g., for the determinism-laminarity curves 222 of FIG. 2C), and m' and s' are derivatives of the mean, m, and the standard deviation, s, respectively. For each variable, the coefficient of variation (CoV) value is compared to a coefficient of variation threshold, $\theta_{CoV}$, the signal to noise (SNR) value is compared to a signal to noise threshold, $\theta_{SNR}$, and a confidence interval zero crossing (ZX) value is compared to a confidence interval zero crossing threshold, $\theta_{zx}$. Variables with $CoV > \theta_{CoV}$, $SNR > \theta_{SNR}$, and $ZX=0$ are deemed critical variables, which represent the particular variables likely to be responsible for the critical state. In a particular implementation, one or more anomaly detection thresholds can be set based on average values and a range of variation of the critical variables. To illustrate, an anomaly detection threshold for a particular critical variable may be set to a value that is one standard error from a mean value of the particular the critical variable during a time window around the critical state.

Figure 3:
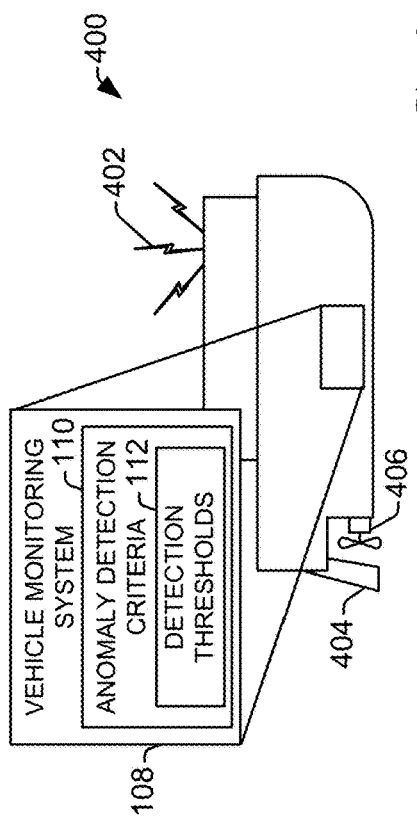
FIG. 3 is an example in which the vehicle of FIG. 1 corresponds to a spacecraft.

FIG. 3 is an example in which the vehicle 102 of FIG. 1 corresponds to a spacecraft 300 (e.g., a satellite). The spacecraft 300 includes the vehicle monitoring system 108, which includes the anomaly detection criteria 110 specifying one or more detection thresholds 112. The vehicle monitoring system 108 is coupled to sensors of various systems of the spacecraft 300. For example, in FIG. 3, the systems 104 of FIG. 1 correspond to a solar power system 302, a communication system 304, and a positioning system 306. In other examples, the systems 104 include more, fewer, or different systems of the spacecraft 300.

Figure 4:
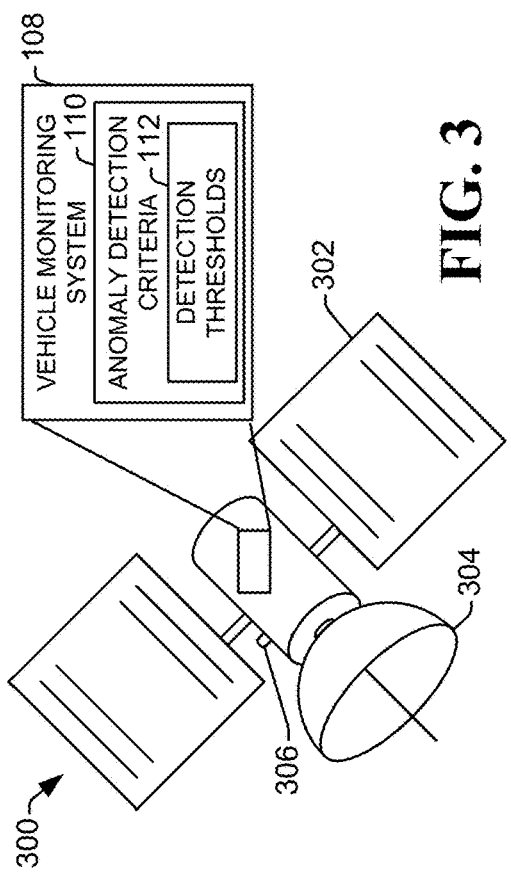
FIG. 4 is an example in which the vehicle of FIG. 1 corresponds to a watercraft.

FIG. 4 is an example in which the vehicle 102 of FIG. 1 corresponds to a watercraft 400 (e.g., a ship). The watercraft 400 includes the vehicle monitoring system 108, which includes the anomaly detection criteria 110 specifying one or more detection thresholds 112. The vehicle monitoring system 108 is coupled to sensors of various systems of the watercraft 400. For example, in FIG. 4, the systems 104 of FIG. 1 correspond to a communication system 402, a steering system 404, and a propulsion system 406. In other examples, the systems 104 include more, fewer, or different systems of the watercraft 400.

Figure 5:
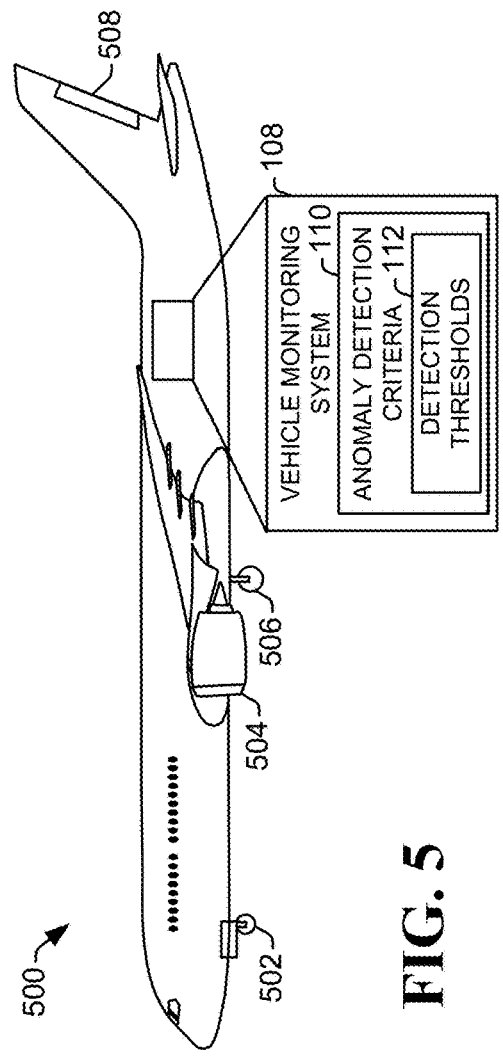
FIG. 5 is an example in which the vehicle of FIG. 1 corresponds to an aircraft.

FIG. 5 is an example in which the vehicle 102 of FIG. 1 corresponds to an aircraft 500 (e.g., an airplane). The aircraft 500 includes the vehicle monitoring system 108, which includes the anomaly detection criteria 110 specifying one or more detection thresholds 112. The vehicle monitoring system 108 is coupled to sensors of various systems of the aircraft 500. For example, in FIG. 5, the systems 104 of FIG. 1 correspond to a front landing gear system 502, an engine 504, a main landing gear system 506, and a control surface 508. In other examples, the systems 104 include more, fewer, or different systems of the aircraft 500.

Figure 6:
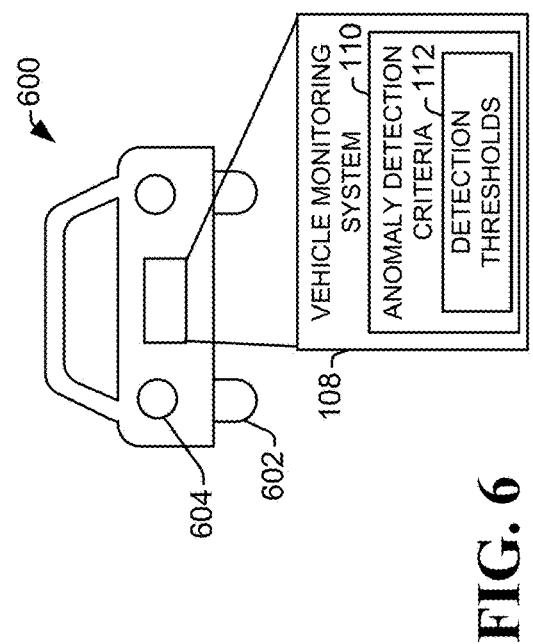
FIG. 6 is an example in which the vehicle of FIG. 1 corresponds to a land craft.

FIG. 6 is an example in which the vehicle 102 of FIG. 1 corresponds to a land craft 600 (e.g., a car). The land craft 600 includes the vehicle monitoring system 108, which includes the anomaly detection criteria 110 specifying one or more detection thresholds 112. The vehicle monitoring system 108 is coupled to sensors of various systems of the land craft 600. For example, in FIG. 6, the systems 104 of FIG. 1 correspond to a steering system 602 and a lighting system 604. In other examples, the systems 104 include more, fewer, or different systems of the land craft 600.

Figure 7:
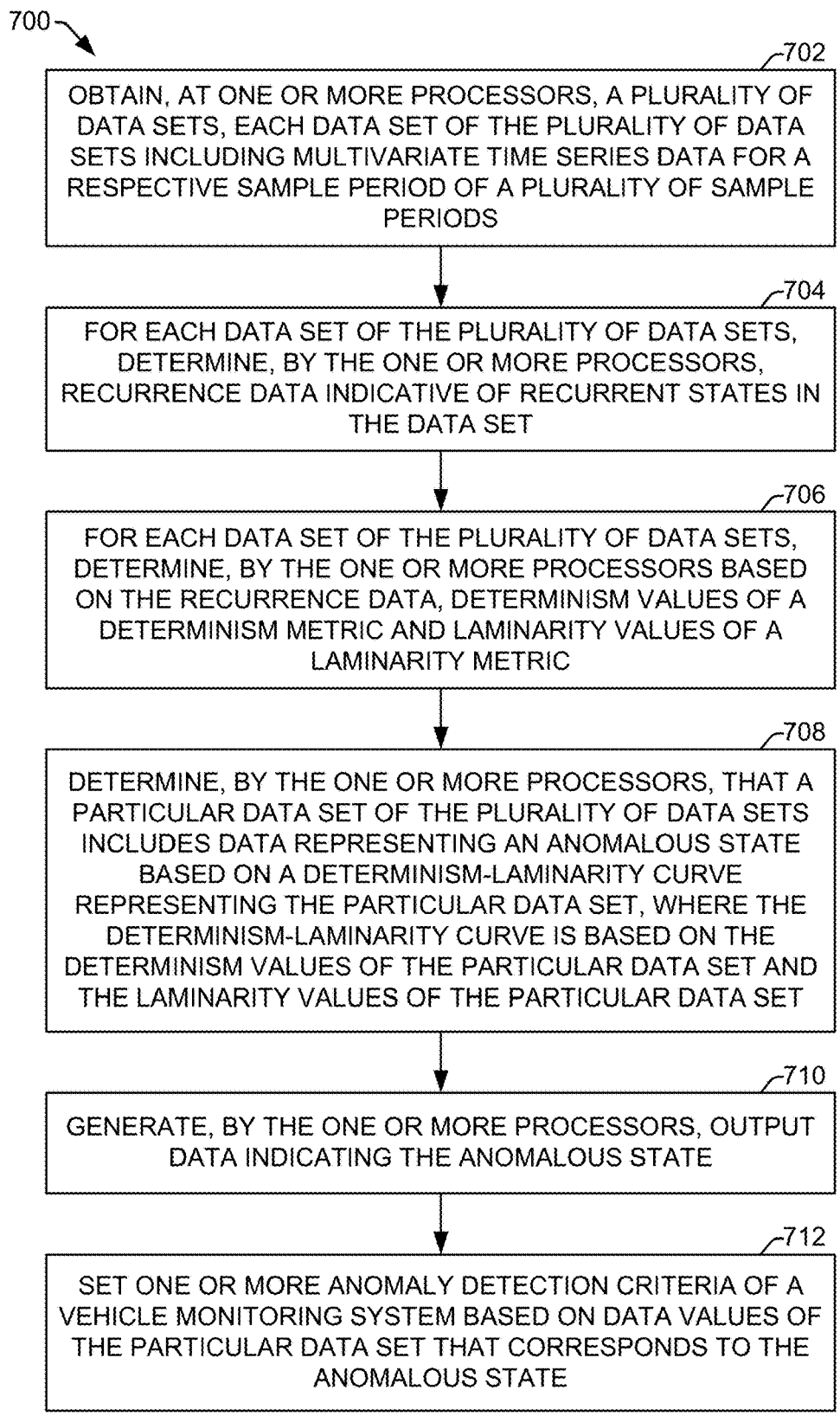
FIG. 7 is a flow diagram of an example of a method of detecting anomalous states in multivariate data.

FIG. 7 is a flow diagram of an example of a method 700 of detecting anomalous states in multivariate data. The method 700 may be initiated, performed, or controlled by the system 100 of FIG. 1, such as by the vehicle 102 of FIG. 1, or any of the specific examples of the vehicle 102 (e.g., the spacecraft 300 of FIG. 3, the watercraft 400 of FIG. 4, the aircraft 500 of FIG. 5 or FIG. 11, or the land craft 600 of FIG. 6) or the computing device 120 of FIG. 1 or FIG. 12.

The method 700 includes, at block 702, obtaining, at one or more processors, a plurality of data sets. Each data set of the plurality of data sets includes multivariate time series data for a respective sample period of a plurality of sample periods. For example, the processor(s) 122 of the computing device 120 of FIG. 1 obtain the multivariate time series data 134 from the vehicle 102 or the memory 124.

The method 700 includes, at block 704, for each data set of the plurality of data sets, determining, by the one or more processors, recurrence data indicative of recurrent states in the data set. For example, the processor(s) 122 of FIG. 1 determine the recurrence data 136 for each data set of the plurality of data sets 132.

The method 700 includes, at block 706, for each data set of the plurality of data sets, determining, by the one or more processors based on the recurrence data, determinism values of a determinism metric and laminarity values of a laminarity metric. For example, the processor(s) 122 of FIG. 1 determine the determinism values 140 of the determinism metric 138 and the laminarity values 144 of the laminarity metric 142 based on the recurrence data 136.

The method 700 includes, at block 708, determining, by the one or more processors, that a particular data set of the plurality of data sets includes data representing an anomalous state based on a determinism-laminarity curve representing the particular data set. The determinism-laminarity curve is based on the determinism values of the particular data set and the laminarity values of the particular data set. For example, the processor(s) 122 of FIG. 1 determine a set of determinism-laminarity curves (such as the determinism-laminarity curves 222 of FIG. 2C). The processor(s) 122 may determine whether any of the data sets include data representing an anomalous state. For example, the processor(s) 122 may compare the determinism-laminarity curve 146 to a representative determinism-laminarity curve of the determinism-laminarity curves 222. The processor(s) 122 may, in response to determining based on the comparison that the determinism-laminarity curve 146 indicates the anomalous state 150 and that the determinism-laminarity curve 146 represents the data set 148, determine that the data set 148 includes data representing the anomalous state 150.

The method 700 includes, at block 710, generating, by the one or more processors, output data indicating the anomalous state. For example, the processor(s) 122 of FIG. 1 generate the output data 160 indicating the anomalous state 150.

The method 700 includes, at block 712, setting one or more anomaly detection criteria of a vehicle monitoring system based on data values of the particular data set that corresponds to the anomalous state. For example, the output data 160 of FIG. 1 may be used to set the detection thresholds 112 (e.g., corresponding to the one or more anomaly detection criteria 110) of the vehicle monitoring system 108. In a particular implementation, setting the one or more anomaly detection criteria includes storing one or more detection thresholds at a memory of the vehicle monitoring system. For example, the detection thresholds 112 may be stored at a memory of the vehicle monitoring system 108 of FIG. 1.

The method 700 provides an efficient mechanism to detect anomalous conditions that may precede fault conditions. The disclosed aspects conserve resources (e.g., processor time and memory) by avoiding the use of a preset threshold to guide the analysis (e.g., to determine determinism and laminarity values), which conserves resources and enables co-analysis of sensor data from a wide variety of different sensor types.

Figure 8:
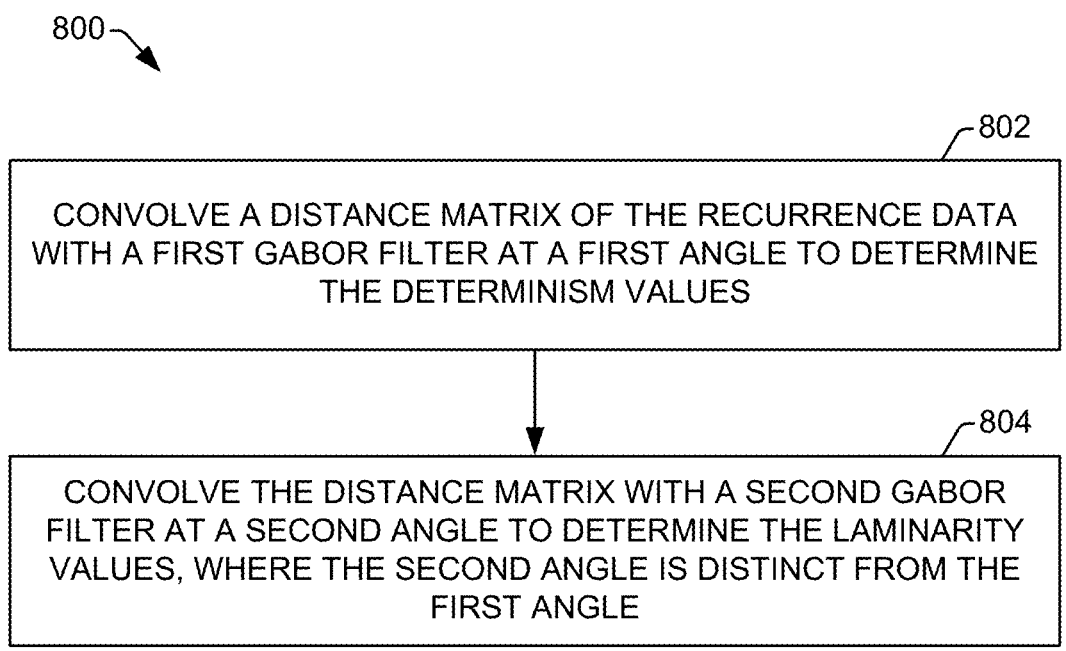
FIG. 8 is a flow diagram of an example of an aspect of the method of FIG. 7 according to a particular implementation.

FIG. 8 is a flow diagram of an example of a method 800 that corresponds to an aspect of the method 700 of FIG. 7 in a particular implementation. The method 800 may be initiated, performed, or controlled by the system 100 of FIG. 1, such as by the vehicle 102 of FIG. 1, or any of the specific examples of the vehicle 102 (e.g., the spacecraft 300 of FIG. 3, the watercraft 400 of FIG. 4, the aircraft 500 of FIG. 5 or FIG. 11, or the land craft 600 of FIG. 6) or the computing device 120 of FIG. 1 or FIG. 12. In a particular aspect, the method 800 is performed as part of determining the determinism values of the determinism metric and the laminarity values of the laminarity metric of block 706 of FIG. 7.

In the particular implementation, the recurrence data determined at block 704 of FIG. 7 includes a distance matrix. In this particular implementation, the method 800 includes, at block 802, convolving the distance matrix with a first Gabor filter at a first angle to determine the determinism values. For example, the processor(s) 122 may convolve the distance matrix 210 with the Gabor filter of Equation 2 with the value of the angle ψ of the Gabor filter set to $$\frac{3\pi}{4}.$$

The method 800 includes, at block 804, convolving the distance matrix with a second Gabor filter at a second angle to determine the laminarity values, where the second angle is distinct from the first angle. For example, the processor(s) 122 may convolve the distance matrix 210 with the Gabor filter of Equation 2 with the value of the angle ψ of the Gabor filter set to $$\frac{\pi}{2}.$$

Determining the determinism values and the laminarity values using the Gabor filters as disclosed in FIG. 8 facilitates unsupervised analysis generation of recurrence data via a threshold-less process. The threshold-less process disclosed reduces the time required to select and test various thresholds and conserves computing resources that would be used to repeat the analysis multiple times using different thresholds.

Figure 9:
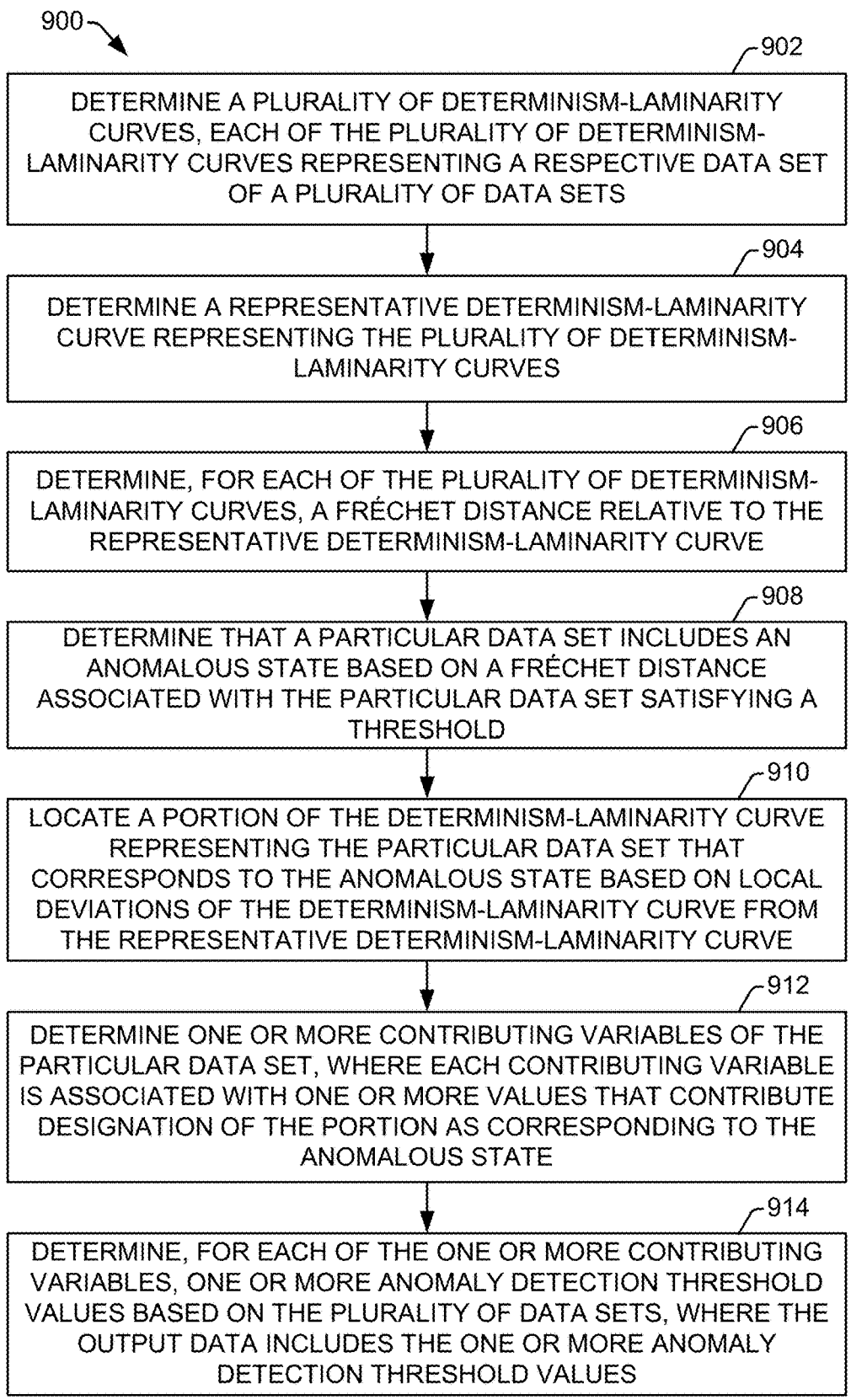
FIG. 9 is a flow diagram of an example of an aspect of the method of FIG. 7 according to a particular implementation.

FIG. 9 is a flow diagram of an example of a method 900 that corresponds to an aspect of the method 700 of FIG. 7 in a particular implementation. The method 900 may be initiated, performed, or controlled by the system 100 of FIG. 1, such as by the vehicle 102 of FIG. 1, or any of the specific examples of the vehicle 102 (e.g., the spacecraft 300 of FIG. 3, the watercraft 400 of FIG. 4, the aircraft 500 of FIG. 5 or FIG. 11, or the land craft 600 of FIG. 6) or the computing device 120 of FIG. 1 or FIG. 12. In a particular aspect, the method 900 is performed as part of determining that a particular data set of the plurality of data sets includes data representing an anomalous state based on a determinism-laminarity curve representing the particular data set of block 708 of FIG. 7.

The method 900 includes, at block 902, determining a plurality of determinism-laminarity curves, each of the plurality of determinism-laminarity curves representing a respective data set of the plurality of data sets. For example, the processor(s) 122 may determine the determinism-laminarity curves 222 of FIG. 2C based on the data set 202 of FIG. 2A.

The method 900 includes, at block 904, determining a representative determinism-laminarity curve representing the plurality of determinism-laminarity curves. For example, the processor(s) 122 may determine the representative determinism-laminarity curve using Equation 3.

The method 900 includes, at block 906, determining, for each of the plurality of determinism-laminarity curves, a Fréchet distance relative to the representative determinism-laminarity curve, and at block 908, determining that a particular data set (of the plurality of data sets) includes data representing an anomalous state based on a Fréchet distance associated with the particular data set satisfying a threshold. For example, the processor(s) 122 may determine a Fréchet distance, $d_F$, between the representative determinism-laminarity curve and each of the determinism-laminarity curves 222. In this example, any determinism-laminarity curve associated with a Fréchet distance, $d_F$, greater than a threshold distance, $\theta_F$, is determined to deviate significantly from the representative determinism-laminarity curve, and therefore to represent an anomalous state.

The method 900 includes, at block 910, locating a portion of the determinism-laminarity curve representing the particular data set that corresponds to the anomalous state based on local deviations of the determinism-laminarity curve from the representative determinism-laminarity curve. For example, the processor(s) 122 may determine a determinism difference between the determinism values of the determinism-laminarity curve and the determinism values of the representative determinism-laminarity curve and a laminarity difference between the laminarity values of the determinism-laminarity curve and the laminarity values of the representative determinism-laminarity curve. In this example, the portion(s) of the determinism-laminarity curve that includes the deviation correspond to portion(s) associated with determinism difference values that exceed a determinism threshold, laminarity difference values that exceed a laminarity threshold, or a combination thereof.

The method 900 includes, at block 912, determining one or more contributing variables of the particular data set, where each contributing variable is associated with one or more values that contribute designation of the portion as corresponding to the anomalous state. For example, the processor(s) 122 may identify the one or more contributing variables using Equations 4-6.

The method 900 includes, at block 914, determining, for each of the one or more contributing variables, one or more anomaly detection threshold values based on the plurality of data sets, wherein the output data includes the one or more anomaly detection threshold values. For example, the processor(s) 122 may determine, each of the one or more contributing variables, one or more anomaly detection threshold values based on or corresponding to the set of values that represent the critical states determined using Equations 4-6. In a particular implementation, one or more anomaly detection thresholds can be set based on average values and a range of variation of the critical variables. To illustrate, an anomaly detection threshold for a particular critical variable may be set to a value that is one standard error from a mean value of the particular the critical variable during a time window around the critical state.

Figure 10:
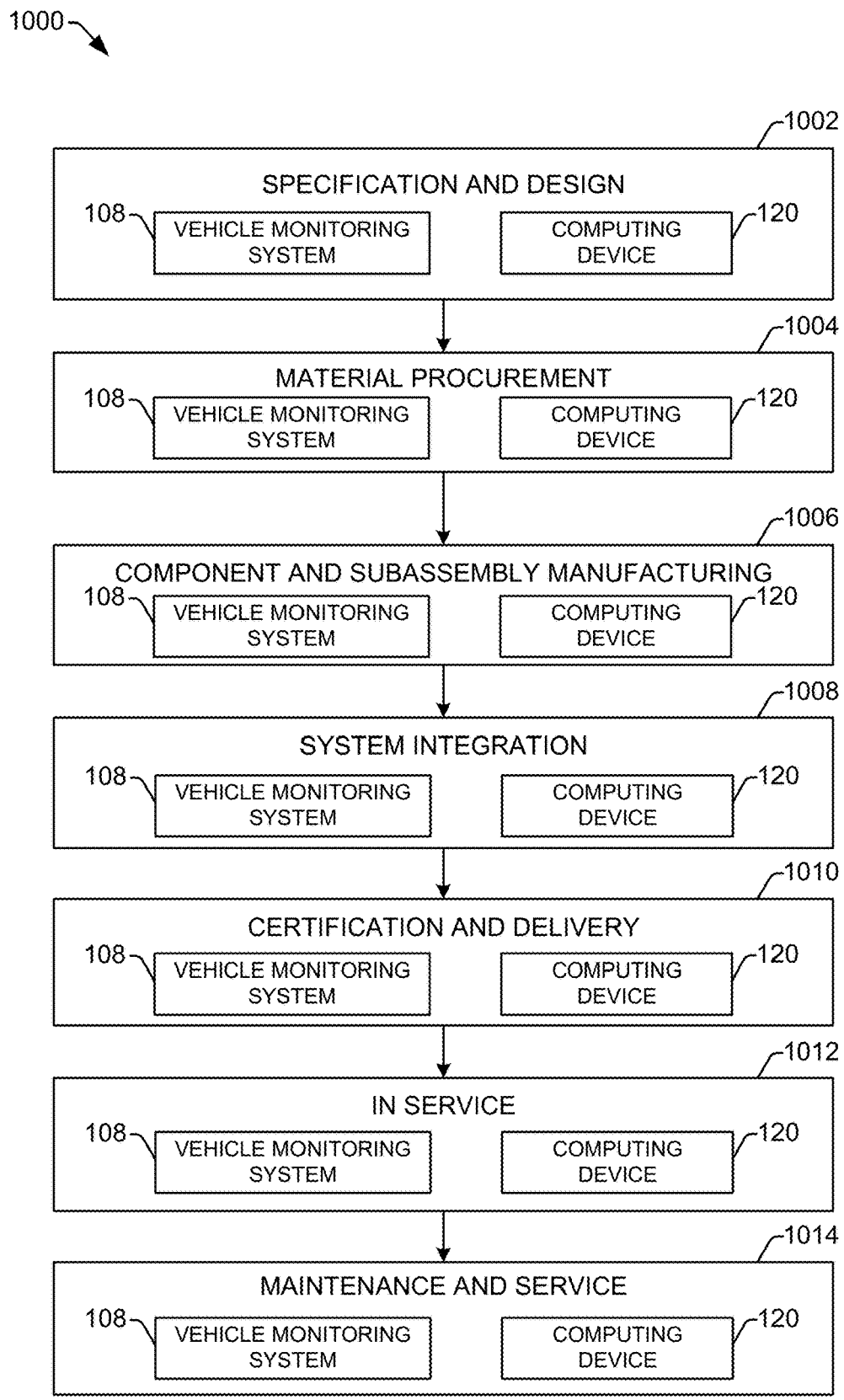
FIG. 10 is a flow diagram illustrating a life cycle of a vehicle that includes the aspects of the system of FIG. 1.

FIG. 10 is a flowchart illustrating a method 1000 representing a life cycle of a vehicle that includes the vehicle monitoring system 108, the computing device 120, or both. The vehicle can include an aircraft, a land craft, a watercraft, or a spacecraft.

During pre-production, the exemplary method 1000 includes, at 1002, specification and design of a vehicle, such as the spacecraft 300 of FIG. 3, the watercraft 400 of FIG. 4, the aircraft 500 of FIG. 5, or the land craft 600 of FIG. 6. During specification and design of the vehicle, the method 1000 may include specification and design of the vehicle monitoring system 108, the computing device 120, or both. At 1004, the method 1000 includes material procurement, which may include procuring materials for the vehicle monitoring system 108, the computing device 120, or both.

During production, the method 1000 includes, at 1006, component and subassembly manufacturing and, at 1008, system integration of the vehicle. For example, the method 1000 may include component and subassembly manufacturing of and system integration of the vehicle monitoring system 108, the computing device 120, or both. At 1010, the method 1000 includes certification and delivery of the vehicle and, at 1012, placing the vehicle in service. Certification and delivery may include certification of the vehicle monitoring system 108, the computing device 120, or both, to place the vehicle monitoring system 108, the computing device 120, or both, in service. While in service by a customer, the vehicle may be scheduled for routine maintenance and service (which may also include modification, reconfiguration, refurbishment, and so on). At 1014, the method 1000 includes performing maintenance and service on the vehicle, which may include performing maintenance and service on the vehicle monitoring system 108, the computing device 120, or both. Additionally, or alternatively, service may be performed responsive to a maintenance event notification 162 output by the vehicle monitoring system.

Each of the processes of the method 1000 may be performed or carried out by a system integrator, a third party, and/or an operator (e.g., a customer). For the purposes of this description, a system integrator may include without limitation any number of manufacturers and major-system subcontractors; a third party may include without limitation any number of venders, subcontractors, and suppliers; and an operator may be an airline, a leasing company, a military entity, a service organization, and so on.

Aspects of the disclosure can be described in the context of an example of a vehicle. A particular example of a vehicle is an aircraft 500 as shown in FIG. 11.

Figure 11:
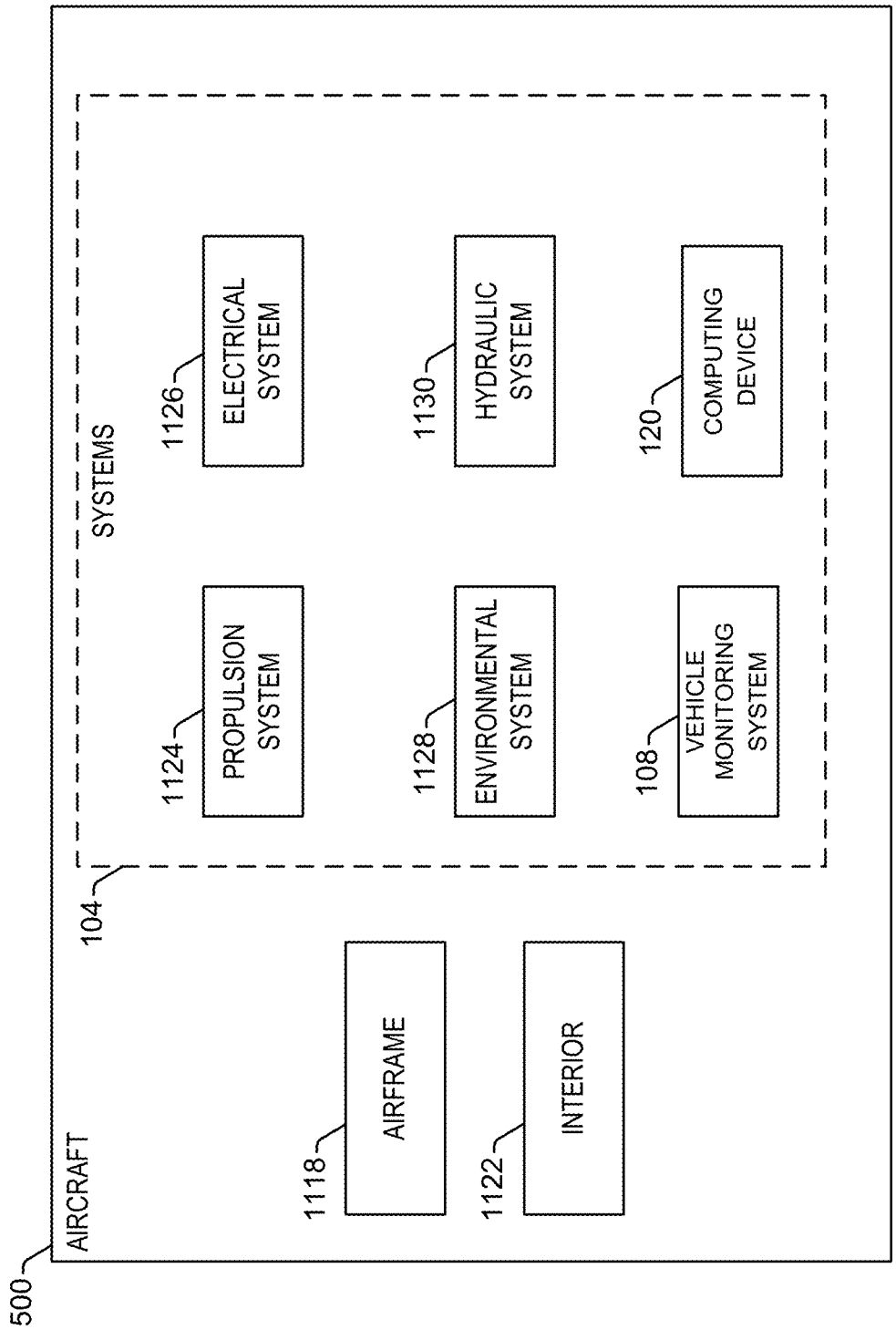
FIG. 11 is a diagram illustrating a particular example of the vehicle of FIG. 1 where the vehicle corresponds to an aircraft.

In the example of FIG. 11, the aircraft 500 includes an airframe 1118 and an interior 1122. The aircraft 500 also includes examples of the systems 104. Examples of the plurality of systems 104 include one or more of a propulsion system 1124, an electrical system 1126, an environmental system 1128, or a hydraulic system 1130. One or more of the systems 104 may be associated with sensors, such as the sensors 106 of FIG. 1, that generate sensor data indicating a state or condition of the corresponding system. The aircraft 500 may also include the vehicle monitoring system 108, the computing device 120, or both.

Figure 12:
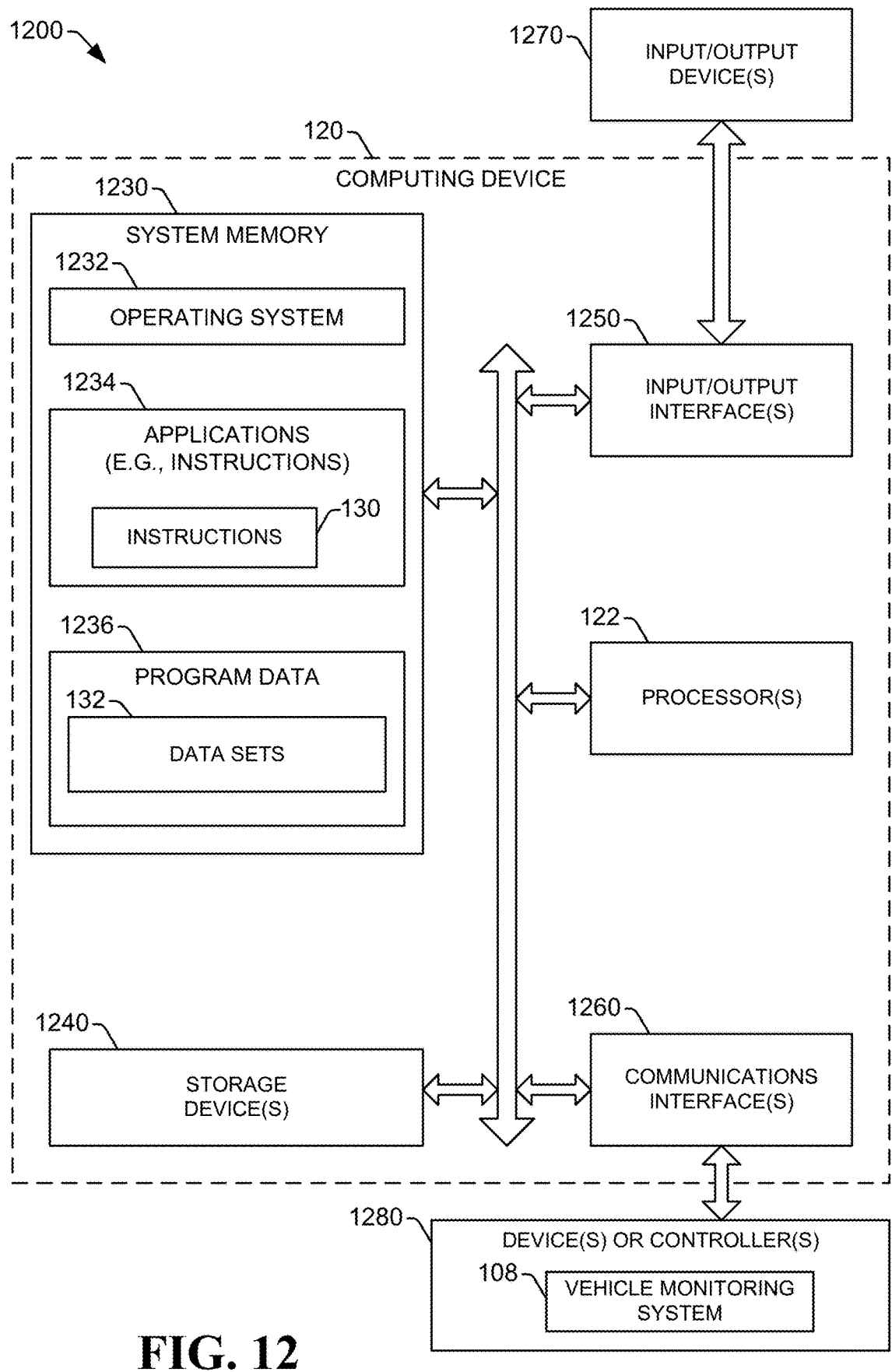
FIG. 12 is a block diagram of a computing environment including a computing device configured to support aspects of detecting anomalous states in multivariate data.

FIG. 12 is a block diagram of a computing environment 1200 including the computing device 120. In the particular implementation illustrated in FIG. 12, the computing device 120 may be included within the vehicle 102 of FIG. 1, any example of the vehicle 102, such as the spacecraft 300 of FIG. 3, the watercraft 400 of FIG. 4, the aircraft 500 of FIG. 5 or FIG. 11, or the land craft 600 of FIG. 6. The computing device 120 is configured to support aspects of computer-implemented methods and computer-executable program instructions (or code) according to the present disclosure. For example, the computing device 120, or portions thereof, is configured to execute the instructions 130 to initiate, perform, or control one or more operations described with reference to FIGS. 1-11.

The computing device 120 includes the one or more processors 122. The processor(s) 122 are configured to communicate with system memory 1230, one or more storage devices 1240, one or more input/output interfaces 1250, one or more communications interfaces 1260, or any combination thereof. The system memory 1230, the storage device(s) 1240, or both, include, correspond to, or are included within the memory 124 of FIG. 1. The system memory 1230 includes volatile memory devices (e.g., random access memory (RAM) devices), nonvolatile memory devices (e.g., read-only memory (ROM) devices, programmable read-only memory, and flash memory), or both. The system memory 1230 stores an operating system 1232, which may include a basic input/output system for booting the computing device 120 as well as a full operating system to enable the computing device 120 to interact with users, other programs, and other devices. In the example illustrated in FIG. 12, the system memory 1230 stores one or more applications 1234, which may include the instructions 130 or other instructions that are executable by the processor(s) 122. In FIG. 12, the system memory 1230 also stores program data 1236, which may include the data sets 132 of FIG. 1.

The one or more storage devices 1240 include nonvolatile storage devices, such as magnetic disks, optical disks, or flash memory devices. In a particular example, the storage devices 1240 include both removable and non-removable memory devices. The storage devices 1240 are configured to store an operating system, images of operating systems, applications (e.g., one or more of the applications 1234), and program data (e.g., the program data 1236). In a particular aspect, the system memory 1230, the storage devices 1240, or both, include tangible (e.g., non-transitory) computer-readable media. In this context, tangible computer-readable media refers to a physical device or composition of matter not merely a signal. In a particular aspect, one or more of the storage devices 1240 are external to the computing device 120.

The one or more input/output interfaces 1250 enable the computing device 120 to communicate with one or more input/output devices 1270 to facilitate user interaction. For example, the one or more input/output interfaces 1250 can include a display interface, an input interface, or both. For example, the input/output interface 1250 is adapted to receive input from a user, to receive input from another computing device, or a combination thereof. In some implementations, the input/output interface 1250 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1270 includes one or more user interface devices and displays, including some combination of buttons, keyboards, pointing devices, displays, speakers, microphones, touch screens, and other devices. In some implementations, the sensor(s) 106 of FIG. 1 communicate with the computing device 120 via the input/output interface(s) 1250. For example, the interface 126 of FIG. 1 may include, correspond to, or be included within the input/output interface(s) 1250.

The processor(s) 122 are configured to communicate with other devices 1280 (e.g., other computing devices or controllers) via the one or more communications interfaces 1260. For example, the communications interface(s) 1260 can include a wired or wireless network interface. In the example illustrated in FIG. 12, the computing device 120 can communicate with the vehicle monitoring system 108 via the communications interface(s) 1260. For example, the interface 126 of FIG. 1 may include, correspond to, or be included within the communications interface(s) 1260.

In some implementations, a non-transitory computer readable medium stores instructions that, when executed by one or more processors, cause the one or more processors to initiate, perform, or control operations to perform part or all of the functionality described above. For example, the instructions may be executable to implement one or more of the operations or methods described with reference to FIGS. 1-11. In some implementations, part or all of one or more of the operations or methods described with reference to FIGS. 1-11 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Particular aspects of the disclosure are described below in several sets of interrelated clauses.

According to Clause 1, a method includes: obtaining, at one or more processors, a plurality of data sets, each data set of the plurality of data sets including multivariate time series data for a respective sample period of a plurality of sample periods; for each data set of the plurality of data sets, determining, by the one or more processors, recurrence data indicative of recurrent states in the data set; for each data set of the plurality of data sets, determining, by the one or more processors based on the recurrence data, determinism values of a determinism metric and laminarity values of a laminarity metric; determining, by the one or more processors, that a particular data set of the plurality of data sets includes data representing an anomalous state based on a determinism-laminarity curve representing the particular data set, wherein the determinism-laminarity curve is based on the determinism values of the particular data set and the laminarity values of the particular data set; and generating, by the one or more processors, output data indicating the anomalous state.

Clause 2 includes the method of Clause 1, further including setting one or more anomaly detection criteria of a vehicle monitoring system based on data values of the particular data set that corresponds to the anomalous state.

Clause 3 includes the method of Clause 2, wherein the multivariate time series data corresponds to sensor data from sensors of one or more vehicles, and wherein setting the one or more anomaly detection criteria includes: identifying the data values of the particular data set that correspond to the anomalous state; identifying one or more sensor types of a subset of the sensors associated with the data values; and determining the one or more anomaly detection criteria, wherein the one or more anomaly detection criteria indicates one or more anomaly detection thresholds associated with the one or more sensor types.

Clause 4 includes the method of Clause 2 or Clause 3, wherein setting the one or more anomaly detection criteria includes storing one or more detection thresholds at a memory of the vehicle monitoring system.

Clause 5 includes the method of any of Clauses 2 to 4, wherein the vehicle monitoring system is onboard a vehicle including one of an aircraft, a spacecraft, a watercraft, or a land vehicle.

Clause 6 includes the method of any of Clauses 2 to 5, wherein the vehicle monitoring system is onboard an aircraft and the multivariate time series data includes data from sensors of a nose landing gear system of the aircraft.

Clause 7 includes the method of any of Clauses 2 to 6, wherein the vehicle monitoring system is configured to generate a maintenance event notification based on the one or more anomaly detection criteria.

Clause 8 includes the method of any of Clauses 1 to 7, wherein the determinism values and the laminarity values are determined using an unthresholded process.

Clause 9 includes the method of any of Clauses 1 to 8, wherein the recurrence data includes a distance matrix, wherein determining the determinism values includes convolving the distance matrix with a first Gabor filter at a first angle, and wherein determining the laminarity values includes convolving the distance matrix with a second Gabor filter at a second angle, the second angle distinct from the first angle.

Clause 10 includes the method of Clause 9, wherein the second angle is angularly offset from the first angle by $\pi/4$.

Clause 11 includes the method of any of Clauses 1 to 10, wherein identifying the anomalous state includes: determining a plurality of determinism-laminarity curves, each of the plurality of determinism-laminarity curves representing a respective data set of the plurality of data sets; determining a representative determinism-laminarity curve representing the plurality of determinism-laminarity curves; and determining, for each of the plurality of determinism-laminarity curves, a Fréchet distance relative to the representative determinism-laminarity curve, wherein the particular data set is determined to include the anomalous state based on a Fréchet distance associated with the particular data set satisfying a threshold.

Clause 12 includes the method of Clause 11, further including, after determining that the particular data set of the plurality of data sets includes the anomalous state, locating a portion of the determinism-laminarity curve representing the particular data set that corresponds to the anomalous state based on local deviations of the determinism-laminarity curve from the representative determinism-laminarity curve.

Clause 13 includes the method of Clause 12, further including, after locating the portion of the determinism-laminarity curve representing the particular data set that corresponds to the anomalous state: determining one or more contributing variables of the particular data set, wherein each contributing variable is associated with one or more values that contribute designation of the portion as corresponding to the anomalous state; and determining, for each of the one or more contributing variables, one or more anomaly detection threshold values based on the plurality of data sets, wherein the output data includes the one or more anomaly detection threshold values.

According to Clause 14, a system includes: a memory configured to store processor-executable instructions and a plurality of data sets, each data set of the plurality of data sets including multivariate time series data for a respective sample period of a plurality of sample periods; and one or more processors configured to execute the processor-executable instructions to cause the one or more processors to: for each data set of the plurality of data sets, determine recurrence data indicative of recurrent states in the data set; for each data set of the plurality of data sets, determine, based on the recurrence data, determinism values of a determinism metric and laminarity values of a laminarity metric; determine that a particular data set of the plurality of data sets includes data representing an anomalous state based on a determinism-laminarity curve representing the particular data set, wherein the determinism-laminarity curve is based on the determinism values of the particular data set and the laminarity values of the particular data set; and generate output data indicating the anomalous state.

Clause 15 includes the system of Clause 14, further including a vehicle monitoring system accessible to the one or more processors, wherein the one or more processors are configured to provide the output data to the vehicle monitoring system to set one or more anomaly detection criteria of the vehicle monitoring system based on data values of the particular data set that corresponds to the anomalous state.

Clause 16 includes the system of Clause 14 or Clause 15, further including a vehicle including multiple sensors, wherein the multivariate time series data corresponds to sensor data from the multiple sensors.

Clause 17 includes the system of Clause 16, wherein setting the one or more anomaly detection criteria includes: identifying the data values of the particular data set that correspond to the anomalous state; identifying one or more sensor types of a subset of the multiple sensors associated with the data values; and determining the one or more anomaly detection criteria, wherein the one or more anomaly detection criteria indicates one or more anomaly detection thresholds associated with the one or more sensor types.

Clause 18 includes the system of any of Clauses 15 to 17, wherein setting the one or more anomaly detection criteria includes storing one or more detection thresholds at a memory of the vehicle monitoring system.

Clause 19 includes the system of any of Clauses 15 to 18, wherein the vehicle monitoring system is onboard a vehicle including one of an aircraft, a spacecraft, a watercraft, or a land vehicle.

Clause 20 includes the system of any of Clauses 15 to 19, wherein the vehicle monitoring system is onboard an aircraft and the multivariate time series data includes data from sensors of a nose landing gear system of the aircraft.

Clause 21 includes the system of any of Clauses 15 to 20, wherein the vehicle monitoring system is configured to generate a maintenance event notification based on the one or more anomaly detection criteria.

Clause 22 includes the system of any of Clauses 14 to 21, wherein the determinism values and the laminarity values are determined using an unthresholded process.

Clause 23 includes the system of any of Clauses 14 to 22, wherein the recurrence data includes a distance matrix, wherein determining the determinism values includes convolving the distance matrix with a first Gabor filter at a first angle, and wherein determining the laminarity values includes convolving the distance matrix with a second Gabor filter at a second angle, the second angle distinct from the first angle.

Clause 24 includes the system of Clause 23, wherein the second angle is angularly offset from the first angle by $\pi/4$.

Clause 25 includes the system of any of Clauses 14 to 24, wherein execution of the processor-executable instructions to identify the anomalous state causes the one or more processors to: determine a plurality of determinism-laminarity curves, each of the plurality of determinism-laminarity curves representing a respective data set of the plurality of data sets; determine a representative determinism-laminarity curve representing the plurality of determinism-laminarity curves; and determine, for each of the plurality of determinism-laminarity curves, a Fréchet distance relative to the representative determinism-laminarity curve, wherein the particular data set is determined to include the anomalous state based on a Fréchet distance associated with the particular data set satisfying a threshold.

Clause 26 includes the system of Clause 25, wherein execution of the processor-executable instructions further causes the one or more processors to, after determining that the particular data set of the plurality of data sets includes the anomalous state, locate a portion of the determinism-laminarity curve representing the particular data set that corresponds to the anomalous state based on local deviations of the determinism-laminarity curve from the representative determinism-laminarity curve.

Clause 27 includes the system of Clause 26, wherein execution of the processor-executable instructions further causes the one or more processors to, after locating the portion of the determinism-laminarity curve representing the particular data set that corresponds to the anomalous state: determine one or more contributing variables of the particular data set, wherein each contributing variable is associated with one or more values that contribute designation of the portion as corresponding to the anomalous state; and determine, for each of the one or more contributing variables, one or more anomaly detection threshold values based on the plurality of data sets, wherein the output data includes the one or more anomaly detection threshold values.

According to Clause 28, a computer-readable storage device stores processor-executable instructions that are executable by one or more processors to cause the one or more processors to perform operations including: obtaining a plurality of data sets, each data set of the plurality of data sets including multivariate time series data for a respective sample period of a plurality of sample periods; for each data set of the plurality of data sets, determining recurrence data indicative of recurrent states in the data set; for each data set of the plurality of data sets, determining, based on the recurrence data, determinism values of a determinism metric and laminarity values of a laminarity metric; determining that a particular data set of the plurality of data sets includes data representing an anomalous state based on a determinism-laminarity curve representing the particular data set, wherein the determinism-laminarity curve is based on the determinism values of the particular data set and the laminarity values of the particular data set; and generating output data indicating the anomalous state.

Clause 29 includes the computer-readable storage device of Clause 28, wherein the operations further include setting one or more anomaly detection criteria of a vehicle monitoring system based on data values of the particular data set that corresponds to the anomalous state.

Clause 30 includes the computer-readable storage device of Clause 29, wherein the multivariate time series data corresponds to sensor data from sensors of one or more vehicles, and wherein operations to set the one or more anomaly detection criteria include: identifying the data values of the particular data set that correspond to the anomalous state; identifying one or more sensor types of a subset of the sensors associated with the data values; and determining the one or more anomaly detection criteria, wherein the one or more anomaly detection criteria indicates one or more anomaly detection thresholds associated with the one or more sensor types.

Clause 31 includes the computer-readable storage device of Clause 29 or Clause 30, wherein operations to set the one or more anomaly detection criteria includes storing one or more detection thresholds at a memory of the vehicle monitoring system.

Clause 32 includes the computer-readable storage device of any of Clauses 29 to 31, wherein the vehicle monitoring system is onboard a vehicle including one of an aircraft, a spacecraft, a watercraft, or a land vehicle.

Clause 33 includes the computer-readable storage device of any of Clauses 29 to 32, wherein the vehicle monitoring system is onboard an aircraft and the multivariate time series data includes data from sensors of a nose landing gear system of the aircraft.

Clause 34 includes the computer-readable storage device of any of Clauses 29 to 33, wherein the vehicle monitoring system is configured to generate a maintenance event notification based on the one or more anomaly detection criteria.

Clause 35 includes the computer-readable storage device of any of Clauses 28 to 34, wherein the operations to determine the determinism values and the laminarity values use an unthresholded process.

Clause 36 includes the computer-readable storage device of any of Clauses 28 to 35, wherein the recurrence data includes a distance matrix, wherein operations to determine the determinism values include convolving the distance matrix with a first Gabor filter at a first angle, and wherein operations to determine the laminarity values include convolving the distance matrix with a second Gabor filter at a second angle, the second angle distinct from the first angle.

Clause 37 includes the computer-readable storage device of Clause 36, wherein the second angle is angularly offset from the first angle by $\pi/4$.

Clause 38 includes the computer-readable storage device of any of Clauses 28 to 37, wherein operations to identify the anomalous state include: determining a plurality of determinism-laminarity curves, each of the plurality of determinism-laminarity curves representing a respective data set of the plurality of data sets; determining a representative determinism-laminarity curve representing the plurality of determinism-laminarity curves; and determining, for each of the plurality of determinism-laminarity curves, a Fréchet distance relative to the representative determinism-laminarity curve, wherein the particular data set is determined to include the anomalous state based on a Fréchet distance associated with the particular data set satisfying a threshold.

Clause 39 includes the computer-readable storage device of Clause 38, wherein the operations further include, after determining that the particular data set of the plurality of data sets includes the anomalous state, locating a portion of the determinism-laminarity curve representing the particular data set that corresponds to the anomalous state based on local deviations of the determinism-laminarity curve from the representative determinism-laminarity curve.

Clause 40 includes the computer-readable storage device of Clause 39, wherein the operations further include, after locating the portion of the determinism-laminarity curve representing the particular data set that corresponds to the anomalous state: determining one or more contributing variables of the particular data set, wherein each contributing variable is associated with one or more values that contribute designation of the portion as corresponding to the anomalous state; and determining, for each of the one or more contributing variables, one or more anomaly detection threshold values based on the plurality of data sets, wherein the output data includes the one or more anomaly detection threshold values.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
obtaining, at one or more processors, a plurality of data sets, each data set of the plurality of data sets including multivariate time series data for a respective sample period of a plurality of sample periods;
for each data set of the plurality of data sets, determining, by the one or more processors, recurrence data indicative of recurrent states in the data set;
for each data set of the plurality of data sets, determining, by the one or more processors based on the recurrence data, determinism values of a determinism metric and laminarity values of a laminarity metric;
determining, by the one or more processors, that a particular data set of the plurality of data sets includes data representing an anomalous state based on a determinism-laminarity curve representing the particular data set, wherein the determinism-laminarity curve is based on the determinism values of the particular data set and the laminarity values of the particular data set; and
generating, by the one or more processors, output data indicating the anomalous state.

2. The method of claim 1, further comprising setting one or more anomaly detection criteria of a vehicle monitoring system based on data values of the particular data set that corresponds to the anomalous state.

3. The method of claim 1, wherein the determinism values and the laminarity values are determined using an unthresholded process.

4. The method of claim 1, wherein the recurrence data includes a distance matrix, wherein determining the determinism values includes convolving the distance matrix with a first Gabor filter at a first angle, and wherein determining the laminarity values includes convolving the distance matrix with a second Gabor filter at a second angle, the second angle distinct from the first angle.

5. The method of claim 4, wherein the second angle is angularly offset from the first angle by $\pi/4$.

6. The method of claim 1, wherein identifying the anomalous state comprises:
determining a plurality of determinism-laminarity curves, each of the plurality of determinism-laminarity curves representing a respective data set of the plurality of data sets;
determining a representative determinism-laminarity curve representing the plurality of determinism-laminarity curves; and
determining, for each of the plurality of determinism-laminarity curves, a Fréchet distance relative to the representative determinism-laminarity curve,
wherein the particular data set is determined to include the anomalous state based on a Fréchet distance associated with the particular data set satisfying a threshold.

7. The method of claim 6, further comprising, after determining that the particular data set of the plurality of data sets includes the anomalous state, locating a portion of the determinism-laminarity curve representing the particular data set that corresponds to the anomalous state based on local deviations of the determinism-laminarity curve from the representative determinism-laminarity curve.

8. The method of claim 7, further comprising, after locating the portion of the determinism-laminarity curve representing the particular data set that corresponds to the anomalous state:
determining one or more contributing variables of the particular data set, wherein each contributing variable is associated with one or more values that contribute designation of the portion as corresponding to the anomalous state; and
determining, for each of the one or more contributing variables, one or more anomaly detection threshold values based on the plurality of data sets, wherein the output data includes the one or more anomaly detection threshold values.

9. A system comprising:
a memory configured to store processor-executable instructions and a plurality of data sets, each data set of the plurality of data sets including multivariate time series data for a respective sample period of a plurality of sample periods; and
one or more processors configured to execute the processor-executable instructions to cause the one or more processors to:
for each data set of the plurality of data sets, determine recurrence data indicative of recurrent states in the data set;
for each data set of the plurality of data sets, determine, based on the recurrence data, determinism values of a determinism metric and laminarity values of a laminarity metric;
determine that a particular data set of the plurality of data sets includes data representing an anomalous state based on a determinism-laminarity curve representing the particular data set, wherein the determinism-laminarity curve is based on the determinism values of the particular data set and the laminarity values of the particular data set; and
generate output data indicating the anomalous state.

10. The system of claim 9, further comprising a vehicle monitoring system accessible to the one or more processors, wherein the one or more processors are configured to provide the output data to the vehicle monitoring system to set one or more anomaly detection criteria of the vehicle monitoring system based on data values of the particular data set that corresponds to the anomalous state.

11. The system of claim 10, further comprising a vehicle comprising multiple sensors, wherein the multivariate time series data corresponds to sensor data from the multiple sensors.

12. The system of claim 10, wherein setting the one or more anomaly detection criteria comprises storing one or more detection thresholds at a memory of the vehicle monitoring system.

13. The system of claim 10, wherein the vehicle monitoring system is onboard a vehicle including one of an aircraft, a spacecraft, a watercraft, or a land craft.

14. The system of claim 10, wherein the vehicle monitoring system is onboard an aircraft and the multivariate time series data includes data from sensors of a nose landing gear system of the aircraft.

15. The system of claim 10, wherein the vehicle monitoring system is configured to generate a maintenance event notification based on the one or more anomaly detection criteria.

16. A computer-readable storage device storing processor-executable instructions that are executable by one or more processors to cause the one or more processors to perform operations comprising:
- obtaining a plurality of data sets, each data set of the plurality of data sets including multivariate time series data for a respective sample period of a plurality of sample periods;
- for each data set of the plurality of data sets, determining recurrence data indicative of recurrent states in the data set;
- for each data set of the plurality of data sets, determining, based on the recurrence data, determinism values of a determinism metric and laminarity values of a laminarity metric;
- determining that a particular data set of the plurality of data sets includes data representing an anomalous state based on a determinism-laminarity curve representing the particular data set, wherein the determinism-laminarity curve is based on the determinism values of the particular data set and the laminarity values of the particular data set; and
- generating output data indicating the anomalous state.

17. The computer-readable storage device of claim 16, wherein the recurrence data includes a distance matrix, wherein operations to determine the determinism values comprise convolving the distance matrix with a first Gabor filter at a first angle, and wherein operations to determine the laminarity values comprise convolving the distance matrix with a second Gabor filter at a second angle, the second angle distinct from the first angle.

18. The computer-readable storage device of claim 16, wherein operations to identify the anomalous state comprise:
- determining a plurality of determinism-laminarity curves, each of the plurality of determinism-laminarity curves representing a respective data set of the plurality of data sets;
- determining a representative determinism-laminarity curve representing the plurality of determinism-laminarity curves; and
- determining, for each of the plurality of determinism-laminarity curves, a Fréchet distance relative to the representative determinism-laminarity curve,
- wherein the particular data set is determined to include the anomalous state based on a Fréchet distance associated with the particular data set satisfying a threshold.

19. The computer-readable storage device of claim 18, wherein the operations further comprise, after determining that the particular data set of the plurality of data sets includes the anomalous state, locating a portion of the determinism-laminarity curve representing the particular data set that corresponds to the anomalous state based on local deviations of the determinism-laminarity curve from the representative determinism-laminarity curve.

20. The computer-readable storage device of claim 19, wherein the operations further comprise, after locating the portion of the determinism-laminarity curve representing the particular data set that corresponds to the anomalous state:
- determining one or more contributing variables of the particular data set, wherein each contributing variable is associated with one or more values that contribute designation of the portion as corresponding to the anomalous state; and
- determining, for each of the one or more contributing variables, one or more anomaly detection threshold values based on the plurality of data sets, wherein the output data includes the one or more anomaly detection threshold values.

* * * * *